United States Patent [19]
Klima et al.

[11] Patent Number: 5,944,223
[45] Date of Patent: *Aug. 31, 1999

[54] RECHARGEABLE DISPENSERS

[75] Inventors: William L. Klima, Stafford, Va.;
Walter F Klima, Travelers Rest, S.C.

[73] Assignee: Sprayex, Inc., Travelers Rest, S.C.

[ * ] Notice: This patent is subject to a terminal disclaimer.

[21] Appl. No.: 08/963,913

[22] Filed: Nov. 4, 1997

Related U.S. Application Data

[63] Continuation of application No. 08/507,691, Jul. 25, 1995, abandoned, which is a continuation-in-part of application No. 08/485,254, Jun. 7, 1995, Pat. No. 5,890,624, which is a continuation-in-part of application No. 08/279,978, Jul. 25, 1994, Pat. No. 5,529,216.

[51] Int. Cl.⁶ .................................................... B05B 9/043
[52] U.S. Cl. ...................... 222/129; 222/383.1; 239/309; 239/333
[58] Field of Search ..................................... 239/304, 309, 239/333; 222/383.1, 82, 129, 136

[56] References Cited

U.S. PATENT DOCUMENTS

| | | | |
|---|---|---|---|
| 2,855,127 | 10/1958 | Lerner et al. | 222/207 |
| 3,024,947 | 3/1962 | Jeynes, Jr. | |
| 3,080,094 | 3/1963 | Modderno. | |
| 3,134,505 | 5/1964 | Modderno. | |
| 3,347,410 | 10/1967 | Schwartzman. | |
| 3,655,096 | 4/1972 | Easter. | |
| 3,760,986 | 9/1973 | Castner et al. | 222/137 |
| 3,786,963 | 1/1974 | Metzler, III | 222/136 |
| 3,870,147 | 3/1975 | Orth. | |
| 3,966,089 | 6/1976 | Klingaman. | |
| 4,177,938 | 12/1979 | Brina. | |
| 4,355,739 | 10/1982 | Vierkötter | 222/134 |
| 4,679,706 | 7/1987 | Magid et al. | 222/130 |
| 4,705,191 | 11/1987 | Itzel et al. | 222/80 |
| 4,793,475 | 12/1988 | Itzel. | |
| 4,832,230 | 5/1989 | Janowitz | 222/136 |
| 4,893,730 | 1/1990 | Bolduc. | |
| 4,925,066 | 5/1990 | Rosenbaum | 222/192 |
| 4,979,638 | 12/1990 | Bolduc. | |
| 5,009,342 | 4/1991 | Lawrence et al. | 222/136 |
| 5,012,978 | 5/1991 | Bolduc. | |
| 5,052,585 | 10/1991 | Bolduc. | |
| 5,056,685 | 10/1991 | Wild. | |
| 5,152,431 | 10/1992 | Gardner et al. | 222/136 |
| 5,152,461 | 10/1992 | Proctor | 222/136 |
| 5,332,157 | 7/1994 | Proctor | 239/304 |
| 5,337,921 | 8/1994 | Wilson et al. | |
| 5,370,275 | 12/1994 | Mills et al. | 222/136 |
| 5,385,270 | 1/1995 | Cataneo et al. | 222/134 |
| 5,398,846 | 3/1995 | Corba et al. | 222/136 |
| 5,402,916 | 4/1995 | Nottingham et al. | 222/383.1 |
| 5,421,483 | 6/1995 | Parise. | |
| 5,439,141 | 8/1995 | Clark et al. | 222/136 |

FOREIGN PATENT DOCUMENTS

| | | |
|---|---|---|
| 0 606 672 A1 | 7/1994 | European Pat. Off. . |
| 1 939 086 | 2/1971 | Germany . |

Primary Examiner—Andres Kashnikow
Assistant Examiner—Lisa A. Douglas
Attorney, Agent, or Firm—Klima & Pezzlo, P. C.

[57] ABSTRACT

Rechargeable dispensers, in particular spray bottle dispensers including at least one chemical reservoir for recharging the spray bottle dispenser. Preferably, a separate solvent reservoir and chemical concentrate reservoirs are provided.

35 Claims, 13 Drawing Sheets

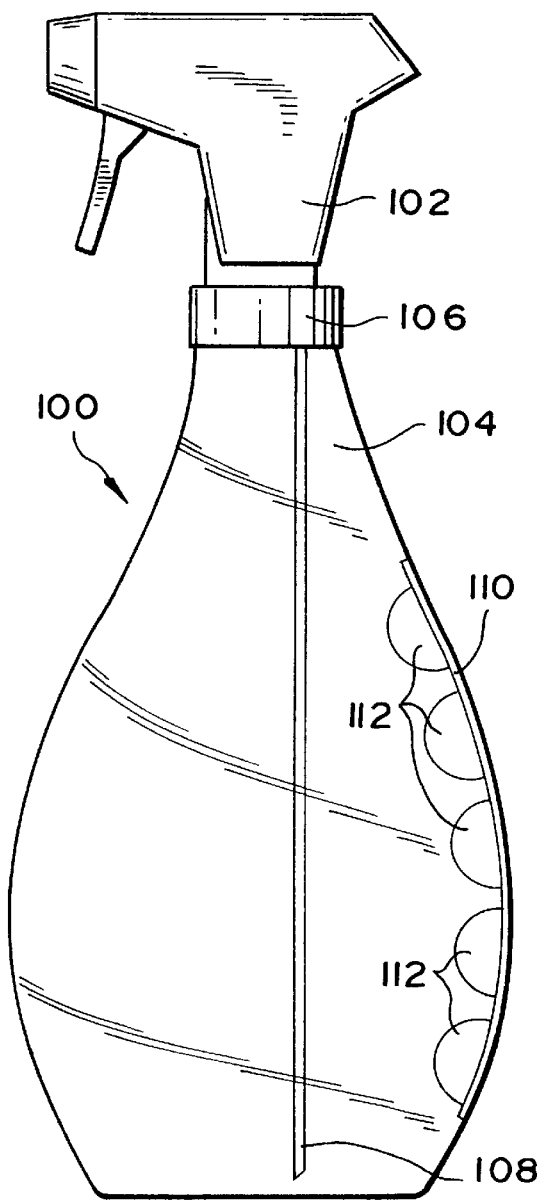
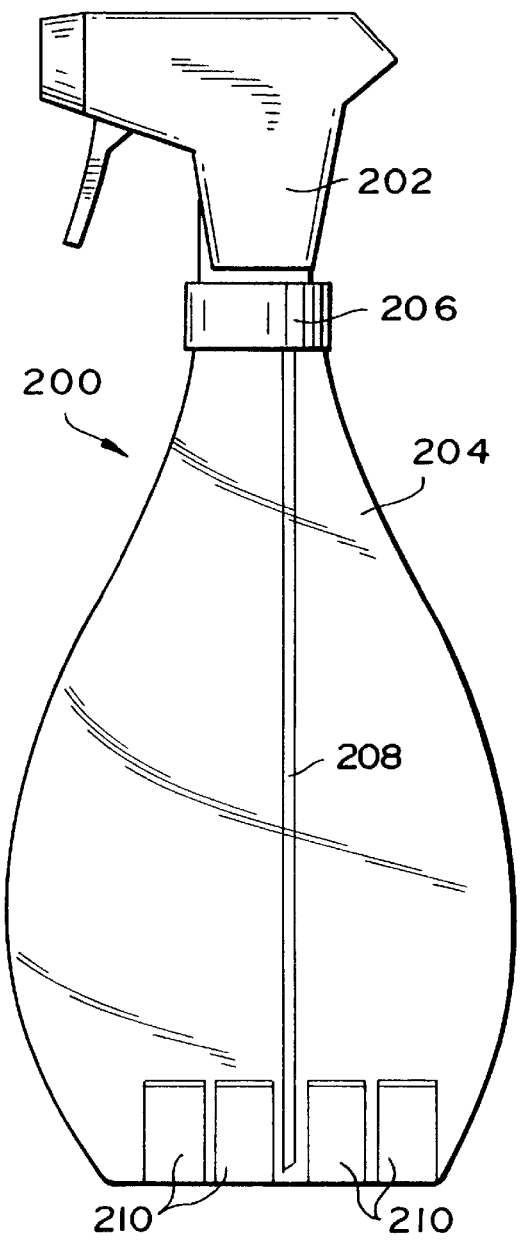
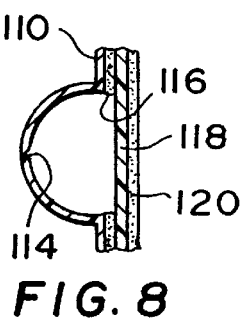
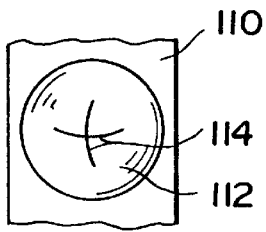

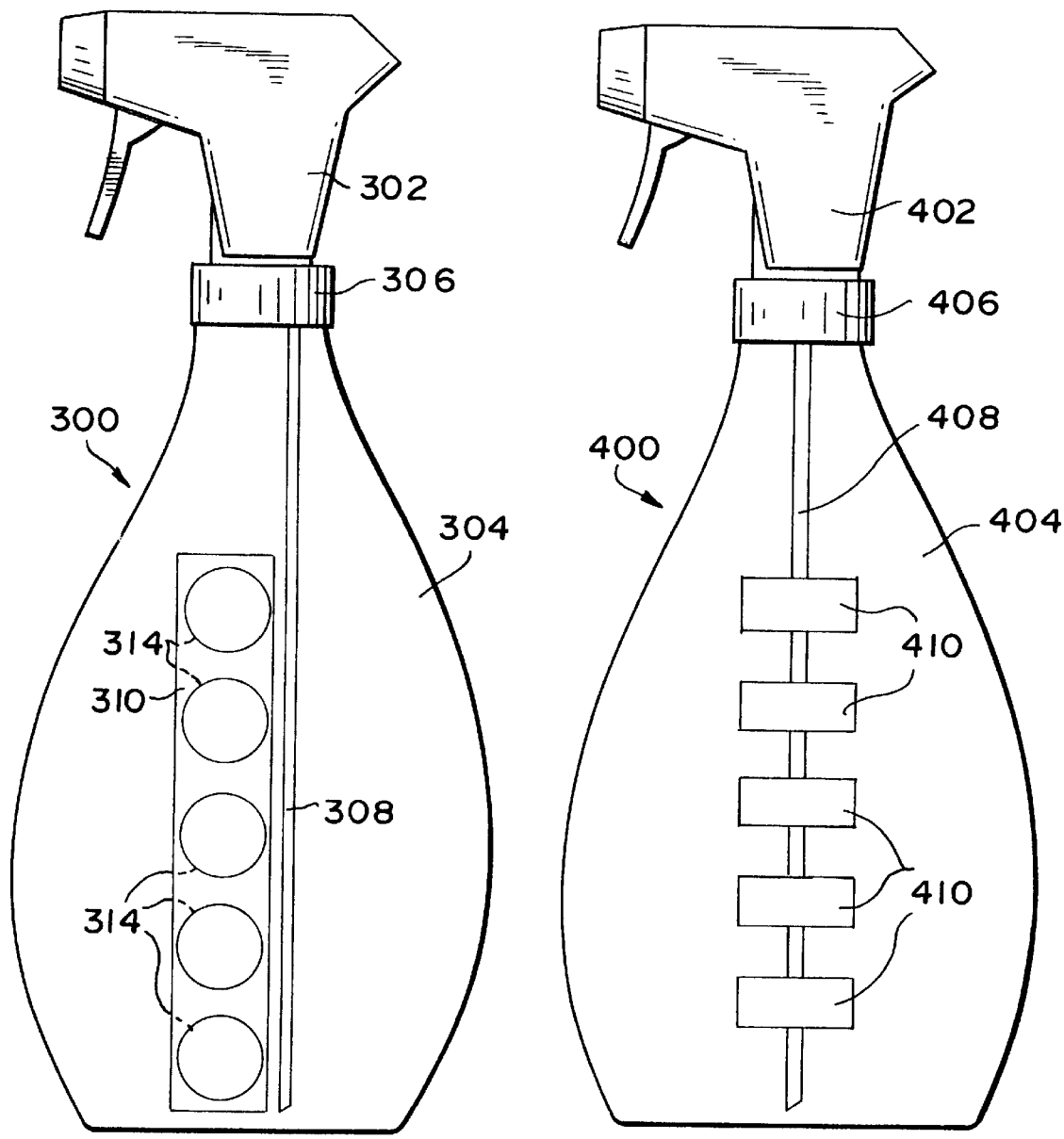
FIG. 12
FIG. 15
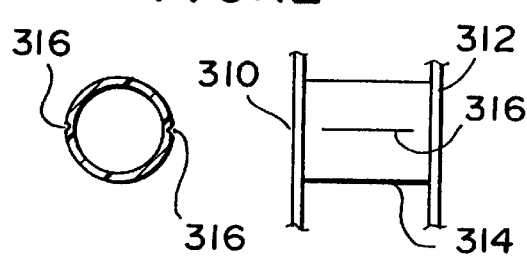
FIG. 13  FIG. 14
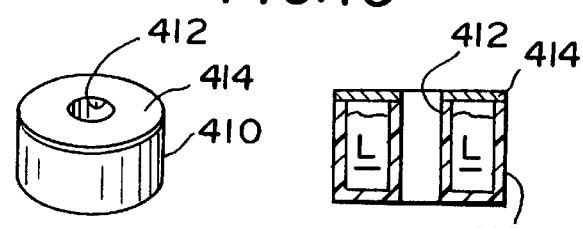
FIG. 16  FIG. 17A

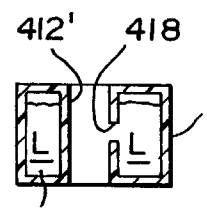
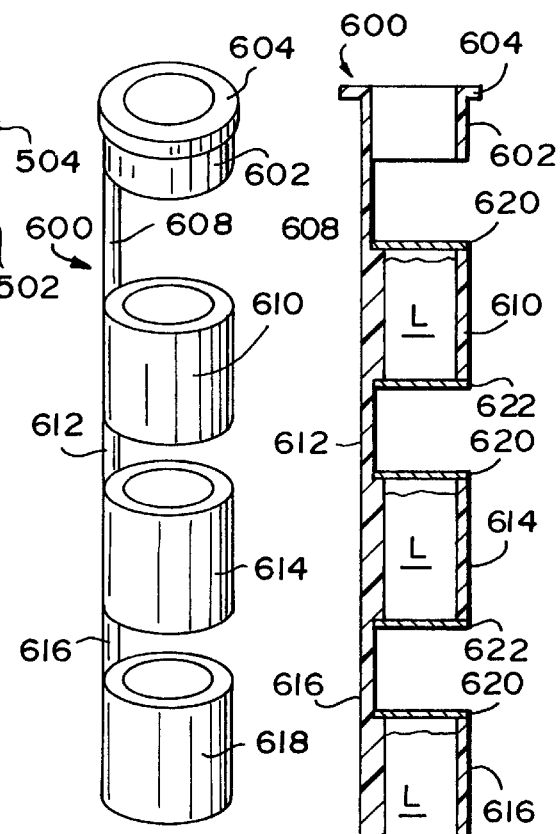

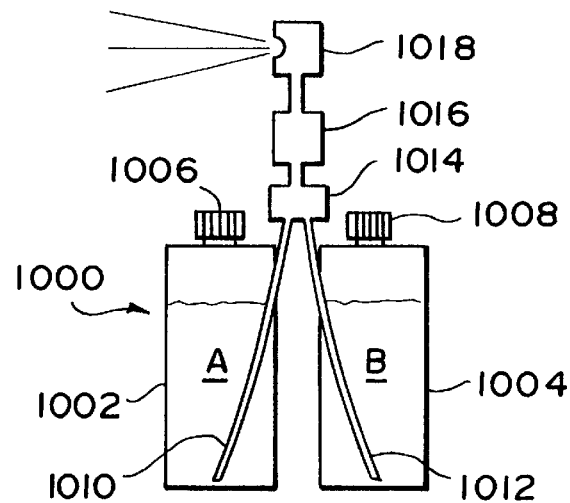
FIG. 28
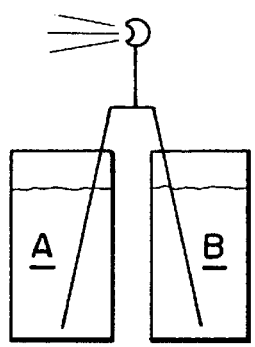 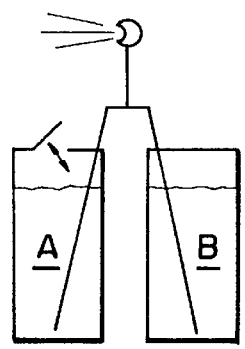 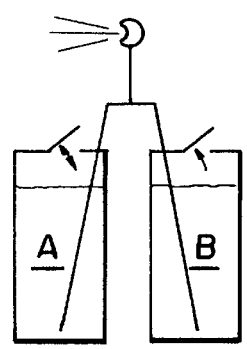
FIG. 29A   FIG. 29B   FIG. 29C
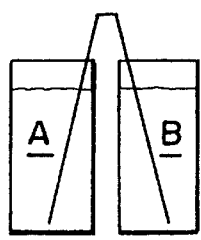 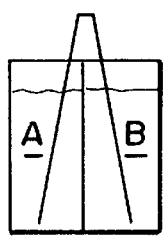 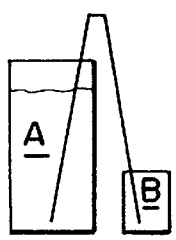 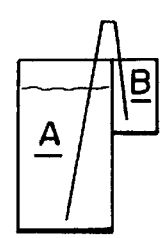
FIG. 30A   FIG. 30B   FIG. 30C   FIG. 30D

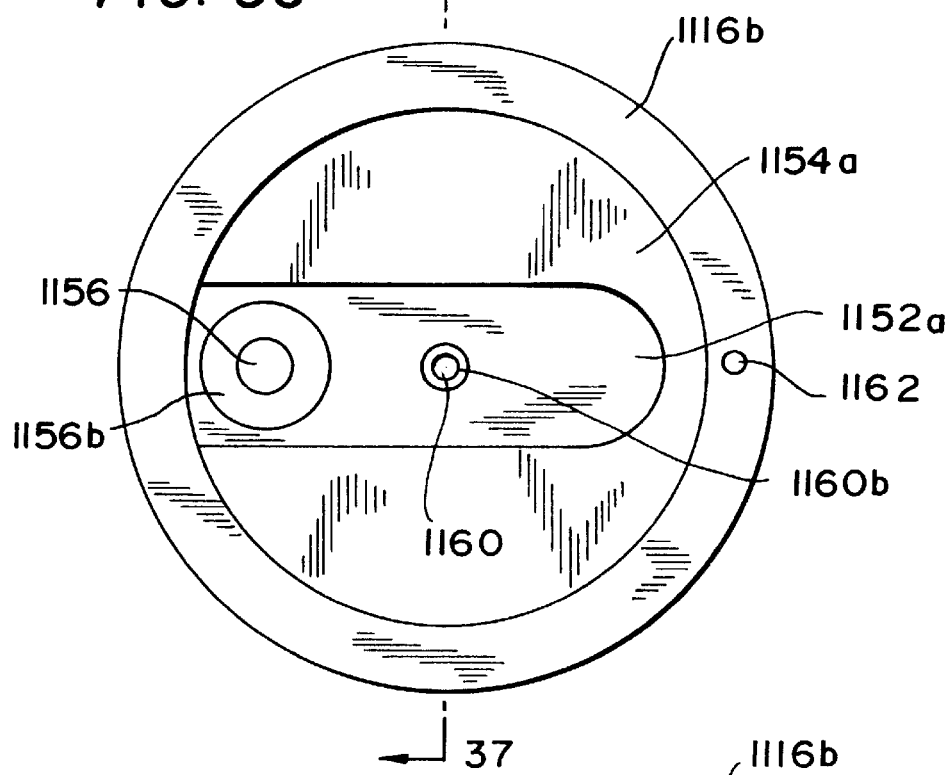
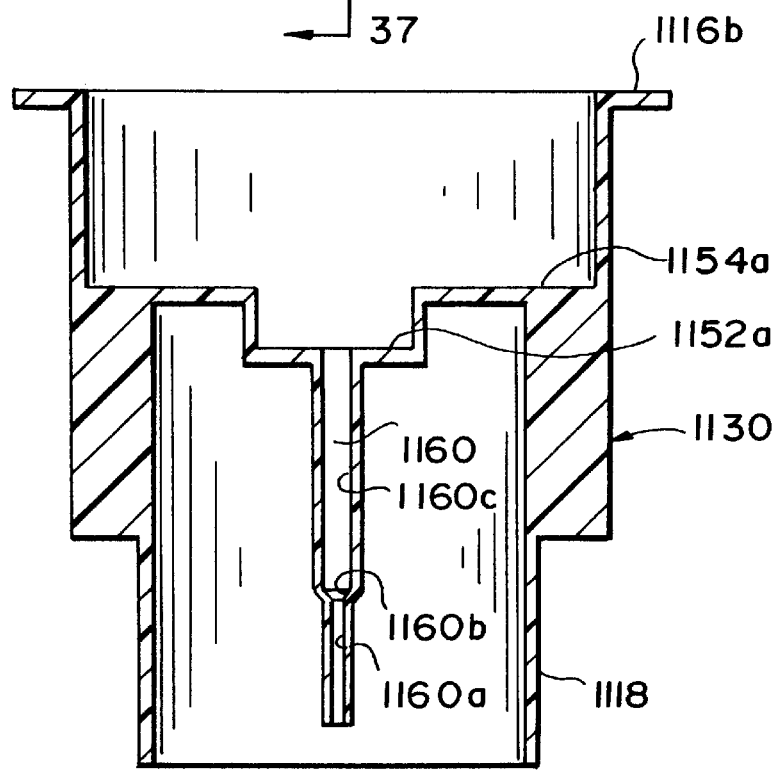

RECHARGEABLE DISPENSERS

RELATED APPLICATION

This application is a continuation of prior U.S. Ser. No. 08/507,691, filed Jul. 25, 1995, now abandoned, which is a continuation-in-part of U.S. patent application entitled "Rechargeable Dispensers", Ser. No. 08/485,254, filed Jun. 7, 1995, now U.S. Pat. No. 5,890,624, which is a continuation-in-part of U.S. patent application entitled "Rechargeable Dispensers", Ser. No. 08/279,978, filed July 25, 1994, now U.S. Pat. No. 5,529,216, and both fully incorporated by reference herein.

FIELD OF THE INVENTION

This invention relates to rechargeable dispensers, in particular rechargeable spray bottle dispensers, that can be recharged or refilled. Specifically, the present invention is particularly directed to spray bottle dispensers having a reservoir containing chemical and a refillable reservoir containing water or solvent associated with the spray bottle dispensers so that the spray bottle dispensers can be recharged by simply adding water or solvent to the refillable reservoir.

In addition, the present invention is directed to bottles and adapters for use with the rechargeable dispensers according to the present invention.

BACKGROUND OF THE INVENTION

The use of spray bottles for dispensing chemical reagents (e.g., water, cleaners, soaps, insecticides, hair spray, etc.) are well-known. Due to regulations limiting the amount of volatile organic carbons (VOCs) released in the atmosphere, products originally contained and dispensed through aerosols are currently being replaced with spray bottles.

Bottlers of chemical reagents typically market their products by purchasing separately empty plastic container bottles and sprayheads. The bottlers then fill, assemble, and label the completed spray bottle packages for delivery to retailers. Consumers purchase the filled spray bottles at the point-of-sale, and then consume the chemical contents of the spray bottle. Most consumers dispose of the spray bottles upon the one time use of the contents of the spray bottles. However, the spray bottles are still fully functional with respect to containing and dispensing chemical reagents, since the plastic bottles are substantially chemically resistant and the sprayheads remain fully functional after consuming the contents. Conventional point-of-sale type spray bottles can be recharged numerous times with chemical concentrate and water (i.e., at least 10 times, possibly 100 times while maintaining full operation). Thus, consumers dispose of large quantities of reusable product (i.e., empty spray bottles) having high utility value.

In today's environment of numerous regulations to control pollution, and consumer and industrial awareness for conserving resources and reducing landfill waste, it is highly desirable to promote the reuse of products that maintain their utility, and dispose of only products that no longer have any utility. Many bottlers are currently selling concentrate in various sized containers to allow consumers to recharge point-of-sale type spray bottles with their particular concentrates. However, many consumers are unwilling to adopt such methods apparently due to some inconvenience in the steps involved with the recharging process of the spray bottles. In particular, there is some inconvenience in removing the sprayhead, opening the chemical concentrate container, pouring the chemical concentrate into the empty spray bottle, adding water, and re-attaching the sprayhead to the bottle. Further, consumers apparently lack interest in recharging spray bottles due to some reluctance based on their inexperience and knowledge in mixing and diluting liquids, which is done by processing chemists for the bottlers. In addition, recharging is usually a messy undertaking due to spillage of chemical concentrate while pouring from one container to the other, overfilling, accidentally knocking over the bottle being filled due to its instability when unfilled, and other undesirable mishaps that can occur, that provide substantial inconveniences.

Importantly, sizeable containers (e.g., pint, quart, gallon, liter sizes) of chemical concentrate can be significantly hazardous to transport and handle by consumers unaware of the potent chemical properties of the chemical concentrates. Specifically, chemical spills of concentrate can damage items around the home including flooring, carpeting, countertop in kitchens and bathrooms, shelves, and other items the chemical concentrate could potentially come into contact with. Further, chemical concentrate can impose a significantly greater health risk to persons coming into accidental contact therewith potentially causing tissue burns and other damage.

Most importantly, chemical concentrate imposes a great risk to children who may accidentally ingest the chemical concentrate and become poisoned. Chemical concentrate greatly increases the chance of permanent injury or death in this regard to children versus current diluted chemical reagents contained in point-of-sale type spray bottles.

SUMMARY OF THE INVENTION

A first object of the present invention is to provide a rechargeable dispenser, for example, a spray bottle dispenser, having a chemical concentrate reservoir and a water or solvent reservoir associated with the spray bottle dispenser.

A second object of the present invention is to provide a rechargeable dispenser, for example, a spray bottle dispenser, having a chemical concentrate reservoir and water or solvent reservoir disposed within the spray bottle dispenser.

A third object of the present invention is to provide a rechargeable dispenser, for example, a spray bottle dispenser, comprising a bottle with a chemical concentrate reservoir and water or solvent reservoir.

A fourth object of the present invention is to provide a rechargeable dispenser, for example, a spray bottle dispenser, having a chemical concentrate reservoir and a refillable water or solvent reservoir.

A fifth object of the present invention is to provide a rechargeable dispenser, for example, a spray bottle dispenser, having a refillable chemical concentrate reservoir and a refillable water or solvent reservoir.

A sixth object of the present invention is to provide a dispenser comprising a liquid chemical concentrate reservoir and a liquid solvent or dilutent reservoir.

A seventh object of the present invention is to provide a rechargeable dispenser comprising a liquid chemical concentrate reservoir and a liquid solvent or dilutent reservoir.

An eight object of the present invention is to provide a rechargeable spray bottle dispenser comprising a liquid chemical concentrate reservoir, a liquid solvent or dilutent reservoir, and a sprayhead in liquid communication with the reservoirs.

A ninth object of the present invention is to provide a rechargeable spray bottle dispenser comprising a refillable/non-refillable liquid chemical concentrate reservoir, a refillable solvent or dilutent reservoir, and a sprayhead in liquid communication with the reservoirs.

A tenth object of the present invention is to provide a rechargeable spray bottle dispenser comprising a bottle for containing solvent or dilutent, a liquid chemical reservoir disposed within the bottle, and a sprayhead in liquid communication with the bottle and reservoir.

An eleventh object of the present invention is to provide products with chemical contents using the dispensers of the above objects one through ten.

These and other objects can be achieved by the rechargeable dispenser, in particular the spray bottle dispenser according to the present invention.

The main concept according to the present invention is to provide a rechargeable dispenser, in particular a spray bottle dispenser package having at least one supply of chemical to allow the spray bottle dispenser to be recharged at least one time. The chemical can be in the form of a gas, liquid, semi-solid or solid. Specifically, the chemical liquid can be a one phase mixture, a two phase mixture, a dispersion or any other chemical reagent having liquid characteristics. The chemical semi-solid can be in the form of a slurry, paste, solid dispersed in a liquid that still exhibits some liquid type characteristics, and the solid can be in the form of powder, granules, tablet or other solid material form.

The chemical is preferably a concentrated chemical that is readily diluted with a solvent, in particular plain water. Preferably, the chemical can be immediately diluted, however, a chemical substance that can go into solution over a 24 hour or longer period of time can potentially be suitable for some applications.

The preferred embodiments of the present invention involve associating at least one quantity of chemical with the spray bottle dispenser itself. Specifically, the chemical is stored in some manner, and connected directly internally or externally to the spray bottle dispenser. However, the present invention is broader in scope to include packaging the chemical and spray bottle dispenser together (i.e., connected indirectly) to be marketed at the point-of-sale. In this embodiment of the invention, a consumer would purchase the package containing a supply of chemical and the spray bottle dispenser, separate at home the spray bottle dispenser that has been filled by the bottler from the package and store the chemical portion of the package separate from the spray bottle dispenser in the household. The user would then retrieve the stored chemical upon consuming the initial contents of the spray bottle dispenser for purposes of recharging the spray bottle dispenser.

The preferred embodiments of the invention store the at least one quantity of chemical directly or indirectly inside or outside the spray bottle dispenser. In the case of an indirect connection to the spray bottle dispenser, a mechanical fastener such as a plastic strip connects an external chemical reservoir to the spray bottle dispenser. In the case of a direct connection, the chemical reservoir is directly connected internally or externally to the spray bottle dispenser. The most preferred embodiments store the at least one quantity of chemical inside the spray bottle dispenser, particularly the bottle portion, to fully contain any inadvertent spills or leakage of chemical through the life of the spray bottle dispenser. These most preferred embodiments provide substantial advantages for handling, recharging and protecting household items from contact with chemical, and most importantly to prevent accidental ingestion by children. This particular point is especially important due to the much greater potency of chemical concentrate versus diluted chemical reagents currently being sold by bottlers at point-of-sale.

The most preferred embodiments also utilize conventional spray bottle dispenser components including plastic bottles, plastic sprayheads, and plastic downtubes. In order to promote products incorporating the present invention, it is particularly important to utilize the standard components that are readily available and relatively very inexpensive due to the large quantities sold and consumed. Thus, an add-on chemical reservoir for storing the chemical is highly desirable.

The most preferred add-on type chemical reservoir is an insert received within the bottle portion of the spray bottle dispenser. This type of insert can be manufactured extremely cheaply in high volume while providing all the performance characteristics necessary for a safe and reliable product. Specifically, the insert can be made with one or more chambers or cells containing chemical that can be accessed in various ways. For example, the reservoir can be sealed with membranes that can be punctured with an instrument, in particular the tip of the downtube. Alternatively, the walls of the chemical reservoir can be designed or configured so as to be readily burst upon application of external pressure to the chemical reservoir. Adding lines of weaknesses, thinning of walls and other means for locally weakening a portion of the chemical reservoir can be implemented for use in the present invention.

Alternatively, one or more of the components of the conventional spray bottle dispenser (e.g., bottle portion, sprayhead portion, downtube) can be modified to provide the chemical reservoir. For example, the walls or bottom of the bottle portion can be modified, by molding a chemical reservoir in one or more sides of bottom of the bottle portion, the sprayhead portion can be provided with a chemical reservoir, and/or the downtube can be provided with an add-on chemical reservoir or the walls of the downtube can be molded to provide a chemical reservoir. However, all of these approaches will initially be substantially greater in cost due to the modification of conventional components not necessitated by the use of an insert according to the present invention.

The insert according to the present invention can take on many different forms and configurations. A first preferred embodiment of the insert is defined by a cylinder having one or more chambers or cells disposed therein. The interior of the cylinder can be provided with one or more bisecting walls to define the chambers along the length thereof. A plastic cylinder having one or more bisecting walls can be easily extruded in plastic. The top and bottom of the one or more chambers of the insert are sealed by upper and lower sealing membranes. The membranes can be films, foils, composites of films and foils, or any other suitable composite that is both chemically resistant and subject to being punctured readily by an instrument, in particular, the tip of the downtube, or can be made to burst.

The upper and lower sealing membranes can be connected to the insert by bonding, adhesive bonding, thermal bonding, sonic welding, or suitable methods for forming a liquid tight seal (e.g., hermetic seal).

This embodiment of the insert can be marketed inside a filled spray bottle dispenser at point-of-sale. The downtube extends through an open chamber of this insert down into the lower portion of the bottle portion to access premixed chemical reagent added by the bottler during manufacture. After consumption of the chemical reagent, a user unscrews the sprayhead and lifts the downtube from the bottle portion. The insert is rotated so that one chemical reservoir is now positioned where the open chamber was previously positioned (i.e., now registered for being punctured by the downtube). The user then forces the tip of the downtube through the upper sealing membrane, down through the chamber, and then punctures the lower sealing membrane. Water can be added through the open chamber of the insert before or after the step of accessing the chemical reservoir by puncturing with the downtube. This configuration allows the chemical to be always stored within the confines of the spray bottle dispenser, and minimizes the steps needed for recharging the spray bottle dispenser.

The consumer will experience little inconvenience in removing the sprayhead and downtube from the bottle portion, rotating the insert, puncturing the chemical reservoir, adding water through the open chamber of the insert, and reassembling the sprayhead portion to the bottle portion. Further, the chemical concentrate stored within the insert is extremely safe for handling and preventing accidental consumption by children (i.e., a child would have to successfully unscrew the sprayhead portion from the bottle portion, fully remove the downtube from the bottle portion, and successfully puncture the insert). Further, even in the event of puncture of the insert by a child, the access opening through the upper sealing membrane would be sufficiently small to substantially limit spilling and containing most chemical from being easily ingested by a child. Thus, the present invention provides substantial safeguards over current methods of selling large quantities of chemical concentrate at the point-of-sale, and subsequently having the consumer handle and mix the chemical concentrate in his or her home.

This particular insert can have one, two, three, four or more separate chambers or cells. For example, in the case of four cells, one cell would be an open cell through which the downtube is initially placed by the bottler during assembly when the spray bottle dispenser is provided with an initial charge of diluted chemical. Thus, in this example, there remains three cells that can be utilized as three separate chemical reservoirs. This four cell configuration would allow the user to initially consume the premixed diluted chemical reagents of the spray bottle dispenser, and then recharge the spray bottle dispenser three more times prior to consuming all the chemical contained in the spray bottle dispenser. If the consumer then disposed of the spray bottle dispenser at that point, this would provide a three time improvement over the current practice of consumers utilizing a spray bottle dispenser one time prior to disposal. Thus, the consumption of spray bottle dispensers could be reduced three-fold (i.e., one-fourth the waste) if fully implemented.

However, this invention can even provide for an even greater improvement over current practices by consumers. Specifically, this insert can also be sold at the point-of-sale as a separate item that could be added to conventional point-of-sale type spray bottle dispensers having no inserts after the initial consumption of the contents, or for use with spray bottle dispensers having inserts according to the present invention after the complete chemical consumption of the inserts initially sold with the units.

This new system would greatly decrease the shipping weight and costs associated therewith, decrease retail shelf space for marketing the product, and most importantly greatly decrease the consumption and waste of plastic material. Specifically, the volume of plastic needed to make the four chamber insert described above would be a small fraction compared with the weight of plastic of four conventional spray bottle dispensers based on equal amounts of useable diluted chemical reagent. Further, the insert when the chemical is completely consumed has little utility value versus the utility value of an emptied conventional spray bottle dispenser that can be reutilized numerous times. Further, conventional spray bottle dispensers are substantially much greater in cost to produce relative to the insert according to the present invention, and would conserve significant labor and other direct and indirect costs associated with the production of conventional spray bottle dispenser components versus the insert according to the present invention. Further, the insert according to the present invention can readily be recycled, and could potentially be refilled if an adequate system were developed to reprocess such inserts, however, more than likely the inserts would be disposed of by consumers based on convenience factors.

A second embodiment of an insert according to the present invention involves forming a strip of chemical reservoirs that can be disposed within the bottle portion of the spray bottle dispenser. The strip of chemical reservoirs can be made at high speed, and would most likely be made in a continuous strip and cut to length when completed for insulation in each spray bottle dispenser. The strip type insert can be manufactured by a high speed molding technique such as vacuum forming the chemical reservoirs from a plastic strip, filling the chemical reservoirs with chemical, and sealing the chemical reservoirs. This completed strip is then cut to length based on the number of reservoirs to be added to the spray bottle dispenser, and is preferably attached by adhesive or other technique to the inside surface of the bottle portion. The chemical reservoirs made of the plastic strip are made in such a manner so that the chemical reservoirs can be punctured by an instrument, in particular, the tip of the downtube, or can be made to burst by adding external pressure to the chemical reservoir. A user can burst one or more (i.e., one, two, three, etc.) of the chemical reservoirs to specifically tailor the concentration of the diluted chemical reagent. Thus, the concept according to the present invention allows the consumer some latitude in selecting concentration levels currently unavailable with conventional spray bottle dispensers.

In a third embodiment, a plurality of separate cylindrical chemical reservoirs can be added to the inside of the bottom portion. The cylinder chemical reservoirs are provided with an upper sealing membrane that can be punctured by an instrument, in particular the tip of the downtube. The cylinder reservoirs can be separate units or connected together by a strip, or by some other manner. The cylindrical chemical reservoirs are preferably located at the bottom wall of the bottom portion to allow easy access by the tip of the downtube during a puncturing operation.

In a fourth embodiment, cylindrical chemical reservoirs bridge the side walls of the bottle portion. The cylinder reservoirs are made so they can be burst by simply pressing together the walls at the location of the particular cylinder reservoir.

In a fifth embodiment, separate donut-shaped chemical reservoirs are added to a conventional downtube. The donut-shaped reservoirs can be made so as to be punctured or burst for chemical access. Alternatively, one or more small holes through the inner surface of the donut-shaped reservoirs can be provided and sealed by the downtube itself (adhesive can also be provided to insure adequate sealing). In this type of arrangement, the chemical inside the donut-shaped reservoir can be accessed by simply pulling the donut-shaped chemical reservoir off the downtube exposing the opening through the inner wall of the donut-shaped reservoir. The donut-shaped reservoir can be removed by unscrewing the sprayhead portion from the bottle portion, lifting the downtube until the lowermost donut-shaped reservoir is located at or near the opening of the bottle portion, holding the donut-shaped reservoir by the fingertips of one hand at the opening to the bottle portion, and then lifting with the other hand the downtube so as to detach the donut-shaped reservoir from the downtube, and then allowing the donut-shaped reservoir to drop into the bottle. Water is added before or after to dilute the concentrate to form the diluted chemical reagent.

In a sixth embodiment, an insert is provided with a plurality of reservoirs in a stepped and stacked array. The top reservoir is thinner and deeper compared with a bottom reservoir that is wider and shallower. One or more reservoirs having dimensions in between that of the top and bottom reservoirs can be provided therebetween. This stepped and stacked arrangement allows easy access to any of the chemical reservoirs by an instrument, in particular the tip of the downtube for puncturing a membrane sealing each reservoir.

In a seventh embodiment, a plurality of reservoirs are provided in an insert and a stacked arrangement. Each reservoir is sealed at the top and bottom with a sealing membrane. A person using a spray bottle dispenser containing this insert initially punctures the upper and lower sealing membranes of the upper reservoir during a first recharging operation, punctures the upper and lower sealing membranes of the middle reservoir to access chemical in the middle reservoir during a second recharging operation, and does the same to the third chemical reservoir in the third recharging operation.

Another mode of the present invention is centered on utilizing liquid chemical concentrate as the preferred source of chemical concentrate. A preferred embodiment of this mode involves a rechargeable spray bottle dispenser having a liquid chemical concentrate reservoir to store one or multiple fills or refills of liquid chemical concentrate. In a most preferred embodiment, the liquid chemical concentrate reservoir is located inside the spray bottle to safely and securely store the liquid chemical concentrate therein. Further, in the most preferred embodiment the size and configuration of the liquid chemical reservoir is selected for a predetermined concentration of liquid chemical concentrate so that the spray bottle dispenser can be refilled at least one time, preferably one to ten times, and potentially up to 100 times. In addition, in the most preferred embodiment, the spray bottle is provided with another access opening (e.g., second neck with cap closure) to allow dilutent such as water to be added to the spray bottle for recharging the spray bottle dispenser without removing the sprayhead from the spray bottle. This configuration allows a user to consume the water in the spray bottle (i.e., one charge), and then replenish the same by simply again adding water to the spray bottle dispenser without any regard to the addition of liquid chemical concentrate, since there is sufficient liquid chemical concentrate contained in the liquid chemical concentrate reservoir to supply one or more charges of water in the spray bottle.

The most preferred spray bottle embodiment of this mode can also be utilized so that the liquid chemical concentrate reservoir only contains enough liquid chemical concentrate for one charge of water into the spray bottle. This chemical product embodiment would potentially allow the chemical product to be shipped and marketed at a point-of-sale with no water supplied in the spray bottle to significantly decrease the shipping weight of the spray dispenser chemical product. The consumer would later charge the spray bottle with water, and then consume the liquid chemical concentrate when using up the one charge of water. Alternatively, the liquid chemical concentrate reservoir can contain additional liquid chemical concentrate to allow more than one charge of water to the spray bottle. Again, however, the spray dispenser chemical product can be shipped initially without water in the spray bottle, and then allowing one fill and one or more refills of the spray bottle dispenser.

The liquid chemical reservoir and the dilutent reservoir can be provided in a variety of different manners. The reservoirs can be separate containers attached or not attached together, reservoirs connected together, reservoir inside a reservoir, or potentially any other type of arrangement. The use of a separate liquid chemical reservoir inside a conventional container such as a conventional spray bottle is particularly desirable, since the molds for the conventional liquid containers would not need to be modified or adapted for use in the present invention. Instead, one focus of the present invention is towards developing an insertable liquid chemical concentrate reservoir that can be accommodated within a conventional container such as a spray bottle. Further, again it is highly desirable in the case of a spray dispenser to utilize conventional sprayheads again to avoid the cost of new development and manufacturing of modified sprayheads. The adapter according to the present invention allows for the use of a separate liquid chemical reservoir with a conventional sprayhead and located inside of a conventional spray bottle.

The adapter arrangement according to the present invention utilizes a downtube extending into the spray bottle and a downtube extending into the liquid chemical reservoir. The adapter includes a mixing chamber for allowing the liquid chemical concentrate and water to be mixed therein prior to reaching the conventional sprayhead. Further, the adapter according to the present invention has a unique configuration to minimize the amount of space consumed inside the liquid storing spray bottle, located in the normal air space (i.e., neck or upper portion) of the spray bottle and configured to be easily molded and cheaply made in very high volume with minimal assembly involved. This unique arrangement should minimize the difficulties required to modify existing production lines or bottlers who institute the present invention in high volume production.

BRIEF DESCRIPTION OF THE DRAWINGS

FIG. 7 is a side elevational view of a second preferred embodiment of the spray bottle dispenser according to the present invention.

FIG. 8 is a partial detailed side cross-sectional view through one reservoir of the spray bottle dispenser shown in FIG. 7.

FIG. 9 is a perspective head-on view of the outer surface of the reservoir shown in FIG. 8, showing the lines of weakness in the reservoir.

FIG. 10 is a side elevational view of a third preferred embodiment of the spray bottle dispenser according to the present invention.

FIG. 11 is a side cross-sectional view of one reservoir of the spray bottle dispenser shown in FIG. 10.

FIG. 12 is a side cross-sectional view of a fourth preferred embodiment of the spray bottle dispenser according to the present invention.

FIG. 13 is a cross-sectional view through one reservoir of the spray bottle dispenser shown in FIG. 12.

FIG. 14 is side elevational view of the one reservoir shown in FIG. 13, showing it bridging between the sides of the bottle portion, and connected at both ends to the sides of the bottle portion.

FIG. 15 is a side elevational view of a fifth preferred embodiment of the spray bottle dispenser according to the present invention.

FIG. 16 is a perspective view of one donut-shaped reservoir of the spray bottle dispenser shown in FIG. 15.

FIG. 17A is a side cross-sectional view of the donut-shaped reservoir shown in FIG. 16.

FIG. 17B is a side cross-sectional view of an alternative donut-shaped reservoir.

FIG. 18 is an insert of a sixth preferred embodiment of the spray bottle dispenser according to the present invention.

FIG. 19 is a cross-sectional view of the upper reservoir of the insert as indicated in FIG. 18.

FIG. 20 is a cross-sectional view of the middle reservoir of the insert as indicated in FIG. 18.

FIG. 21 is a cross-sectional view of the lower reservoir of the insert as indicated in FIG. 18.

FIG. 22 is an insert of a sixth preferred embodiment of the spray bottle dispenser according to the present invention.

FIG. 23 is a side longitudinal cross-sectional view of the insert shown in FIG. 22.

FIG. 24 is a side elevational view of an insert with a mechanical connector according to the present invention.

FIG. 25 is a cross-sectional view of the mechanical coupler, as shown in FIG. 24.

FIG. 28 is a diagrammatic view of an embodiment of a spray dispenser according to the present invention having a refillable solvent container and a refillable chemical concentrate container each having a downtube connected to a pump type sprayhead.

FIG. 29A is a diagrammatic view of a spray dispenser according to the present invention having a non-refillable solvent container and a non-refillable chemical concentrate container.

FIG. 29B is a diagrammatic view of a spray dispenser according to the present invention having a non-refillable solvent container and a refillable chemical concentrate container.

FIG. 29C is a diagrammatic view of a spray dispenser according to the present invention having a refillable solvent container and a refillable chemical concentrate container.

FIG. 30A is a diagrammatic view of a spray dispenser according to the present invention having a separate solvent container and a separate chemical concentrate container.

FIG. 30B is a diagrammatic view of a spray dispenser according to the present invention having a combined solvent container and chemical concentrate container.

FIG. 30C is a diagrammatic view of a spray dispenser according to the present invention having a separate larger solvent container and a separate smaller chemical concentrate container.

FIG. 30D is a diagrammatic view of a spray dispenser according to the present invention having a combined larger solvent container and a smaller chemical concentrate container.

FIG. 36 is a top planar view of the lower body portion the dissassembled adapter shown in FIG. 35.

FIG. 37 is a side cross-sectional view of the lower body portion as indicated in FIG. 36.

DETAILED DESCRIPTION OF THE PREFERRED EMBODIMENTS

Definitions

Figure 1:
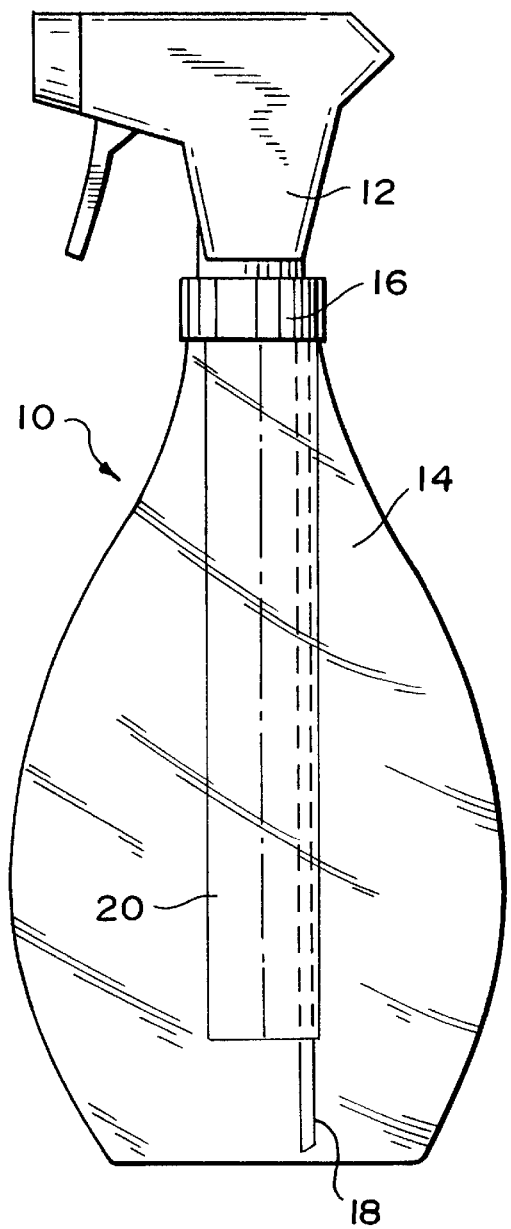
FIG. 1 is a side elevational view of a first preferred embodiment of the spray bottle dispenser according to the present invention.

The spray bottle dispenser according to the present invention includes one or more reservoirs containing chemical or chemicals (i.e., chemical reservoirs).

The chemical reservoir can be a separate unit indirectly associated with the spray bottle dispenser by packaging, or directly associated to the spray bottle dispenser by connection to the spray bottle dispenser externally or internally. Preferred embodiments contain the one or more chemical reservoirs internally, most preferably contained inside the bottle portion to fully contain any inadvertent chemical spill or release from the one or more chemical reservoirs.

In the case of an external connection with the spray bottle dispenser, the chemical reservoir can be connected by a separate piece mechanical fastener such as a plastic tab or strip connector connecting the chemical reservoir to the bottle portion, sprayhead portion, or connected to both the bottle portions and sprayhead portions of the spray bottle dispenser.

Alternatively, the chemical reservoir can be formed as an integral portion of the bottle portion, sprayhead portion, and/or downtube. In the integral embodiments, the chemical reservoir can be connected by adhesive, plastic welding, plastic forming (e.g., molding), or by other means to directly integrate the reservoir into the spray bottle dispenser components.

In a preferred embodiment, the spray bottle dispenser is provided with one or more separate chemical reservoirs to allow the spray bottle dispenser to be recharged one or more times. In a most preferred embodiment, the spray bottle dispenser is provided with one or more chemical reservoirs to allow the user to access more than one chemical reservoirs during a single recharge to increase (e.g., double, triple, quadruple, etc.) the chemical concentration of the recharging mixture in the particular recharging operation.

The chemical reservoirs can be identical units to simplify and reduce costs of manufacturing, or alternatively, can be different size, shape and/or configuration of chemical reservoirs. For example, both internally and externally connected chemical reservoirs can be applied, and/or integral and separate type chemical reservoirs can be combined.

The one or more chemical reservoirs of the spray bottle dispenser contain chemical or chemicals. Specifically, the reservoir can be filled or partially filled with only a single chemical compound, a one phase mixture of chemicals, a two phase mixture of chemicals, a dispersion, or any other liquid type chemical(s). Alternatively, the chemical(s) can be in the form of a solid such as a tablet, powder, or granules, or semi-solid such as a thick slurry. In any event, the reservoir should contain a chemical reagent that is readily diluted or dissolvable with a solvent, particularly plain water.

A preferred embodiment of a spray bottle dispenser 10 according to the present invention is shown in FIGS. 1–5. The spray bottle comprises a sprayhead portion 12 including an inner threaded coupler 16 threaded onto an outer threaded neck of the bottle portion 14. A downtube 18 is connected to the sprayhead 12 portion, and extends down into the bottom of the bottle portion 14.

Figure 2:
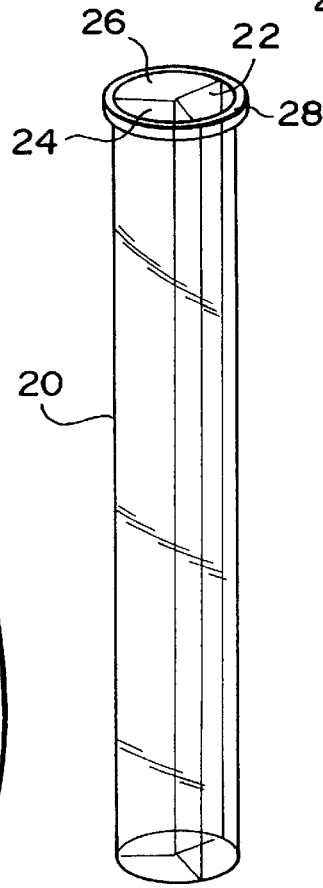
FIG. 2 is a perspective view of the insert having three (3) separate chambers or cells defining two chemical reservoirs and an empty chamber with the insert removed from the bottle portion of the spray bottle dispenser shown in FIG. 1.
Figure 5:
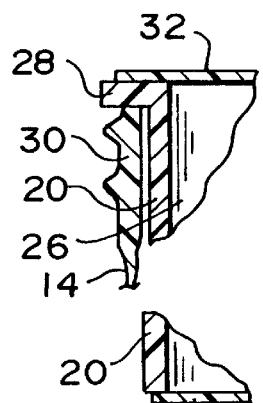
FIG. 5 is a partial detailed view showing the lip of the insert being supported by the mouth of the bottle portion of the spray bottle dispenser shown in FIG. 1 to suspend the insert in the bottle.

The spray bottle dispenser 10 is fitted with an insert 20 having three separate chambers 22, 24 and 26. In the embodiment of the insert 20 as shown in FIG. 2, the insert is provided with a rim 28 on an upper portion of the insert 20. The rim 28 has a diameter greater than the inner diameter of the threaded neck 30 of the bottle 14, as shown in FIG. 5. Thus, the rim 28 functions to suspend the insert 20 within the bottle 14.

The chambers 22, 24 and 26 are used for storing a predetermined quantity of liquid concentrate in each chamber. The chambers 24 and 26 are sealed at the top by an upper sealing membrane 32 and the bottom of the chambers 24 and 26 are sealed by lower sealing membrane 34 as shown in FIG. 5. The chamber 22 is open (i.e., not covered by sealing membranes 32, 34) to accommodate the downtube 18, and also allow solvent such as water to be added through the insert into the bottle portion 14.

The insert 20 is preferably made of suitable plastic material, and the upper sealing membrane 32 and lower sealing membrane 34 are preferably made of suitable plastic film, metal foil, or other suitable single or composite layer. The membranes should be chemically resistant to the contents and suitable for making a liquid tight seal with the insert. The upper sealing membrane 32 and lower sealing membrane 34 can be attached to the insert 20 by various means. For example, the membranes 32 and 34 can be attached by bonding, adhesive bonding, thermal welding, sonic welding, or by any suitable conventional means for providing a liquid tight seal (e.g., hermetic seal) of the chambers 22, 24 and 26.

Figure 6A:
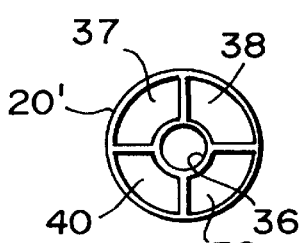
FIG. 6A is a preferred alternative insert having an empty center chamber to accept a downtube centered in the mouth of the bottle portion, and having four (4) chemical reservoirs.
Figure 6B:
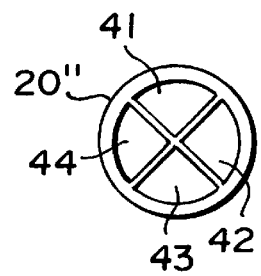
FIG. 6B is a preferred alternative insert having four (4) chambers or (i.e., three chemical reservoirs and one empty chamber) cells, instead of three (3) chambers of the insert shown in FIG. 2.

Various other inserts having suitable configurations can be substituted for the insert 20 shown in FIG. 1. For example, a five (5) chamber insert 20' having an open center chamber 36 and four (4) chemical chambers 37, 38, 39 and 40, is shown in FIG. 6A, and a four (4) chamber insert 20" having chambers 41, 42, 43 and 44, is shown in FIG. 6. Further, the length of the insert relative to the length of the bottle 14 can be substantially varied based on different concentration levels of the concentrate utilized in the insert. Specifically, higher concentration concentrate requires less volume in the chambers of the insert, and thus reducing the needed length of the insert.

The insert 20 can be made by a variety of different techniques, however, injection molding or extruding techniques are the most suitable methods of manufacture.

The insert 20 can be marketed inside the bottle at the point-of-sale, and/or can be marketed as a separate unit that can be inserted into a conventional spray bottle.

Figure 3:
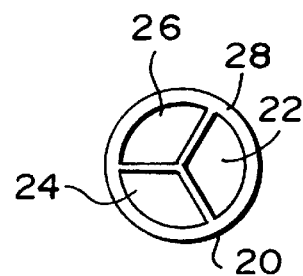
FIG. 3 is a top planer view of the insert shown in FIG. 2.
Figure 4:
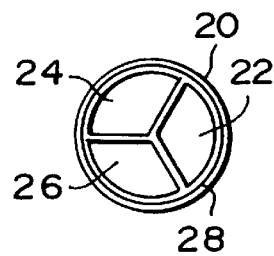
FIG. 4 is a bottom planer view of the insert shown in FIG. 2.

In the case of the insert being marketed inside the bottle, all three (3) chambers 22, 24 and 26 can initially be chemical reservoirs. The bottle is filled with water or other suitable diluting liquid and the top sealing membrane 32 and bottom sealing membrane 34 sealing the chamber 22 can be punctured by the tip of the downtube 18 during insertion of the downtube into the bottle portion prior to securely fastening the sprayhead to the bottle portion to complete the packaging assembly. Alternatively, the chamber 22 may be open (i.e., devoid of any liquid concentrate, as discussed above) and the bottle is initially filled with proper concentration diluted chemical reagent liquid ready to be marketed with the downtube 18 passed through the open chamber 22 during assembly. In the embodiment having three (3) chambers as shown in FIG. 3, two additional doses of concentrate contained in chambers 24 and 26 can be sequentially punctured by the consumer to dose a bottle with concentrate. The bottle 14 can be supplied with water through empty chamber 22 before or after the dosing step by the consumer.

A second embodiment of a spray bottle 100 according to the present invention as shown in FIGS. 7–9. The spray bottle 100 comprises a sprayhead portion 102 and a bottle portion 104. The sprayhead portion 102 includes a threaded coupler 106 for connecting the sprayhead portion 102 to a threaded neck of the bottle portion 104. A downtube 108 is connected to the sprayhead portion 102, and extends down to the bottom of the bottle portion 104.

In this second embodiment, a strip 110 having a plurality of chemical reservoirs 112 containing liquid concentrate is provided in the bottle portion 104. The strip 110 is attached to an inside surface of one wall of the bottle portion 104. The specific location of the strip 110 can be changed from that shown in FIG. 7 to other locations on the side and/or bottom of the bottle portion 104. Each chemical reservoir 112 is made in a manner so that it can be ruptured either by forcing the tip of the downtube 108 into the surface of the reservoir 112, or by pinching the outside walls of the bottle portion 104 together to burst one or more chemical reservoirs 112. For example, the chemical reservoir 112 can be made so that its wall has one or more lines of weakness 114, as shown in FIGS. 8 and 9.

The strip 110 is preferably made in an infinite length, and then cut to length for the particular application. Thus, different size bottles could potentially have more or less number of individual chemical reservoirs 112. Further, making the strip 112 in an infinite manner would allow for high speed production of the strip 110 for high speed insertion during bottling. In the embodiment shown in FIG. 8, the strip 110 is provided with an adhesive layer 116 connecting a sealing layer 118 to the back of the strip 110. Another adhesive layer connects the strip 110 to the wall of the bottle portion 104.

A third embodiment of a spray bottle dispenser 200 according to the present invention is shown in FIGS. 10 and 11. The spray bottle dispenser 200 comprises a sprayhead portion 202 and a bottle portion 204. The sprayhead portion 202 includes a threaded coupler 206 for connecting the sprayhead 202 to a threaded neck of the bottle portion 204. A downtube 208 is connected to the sprayhead portion 202, and extends down to the bottom portion of the bottle portion 204.

In this third embodiment, a plurality of chemical reservoirs 210 are provided at the bottom of the bottle portion 204. The chemical reservoirs 210 can be individual chemical reservoirs, or alternatively, can be connected together by mechanical coupler in some manner. In any event, the chemical reservoirs 210 must be configured in such a manner so that they can be passed through the open mouth of the bottle portion 204.

A detailed cross-sectional view of one of the chemical reservoirs 210 is shown in FIG. 11. The chemical reservoir 210 can be cylindrical or some other suitable shape with an open end 212 at a top portion thereof. The open end 212 is sealed with a metal foil 214 that can be punctured by an instrument, in particular the tip of the downtube 208. The reservoir 210 is at least partially filled with a chemical concentrate liquid L.

In use, the spray bottle dispenser 200 is filled by the bottler with diluted chemical reagent. The four (4) chemical reservoirs 210 are each at least partially filled with a chemical concentrate. Thus, this particular configuration allows for four (4) recharging operations. Each recharging operation begins with unscrewing the threaded coupler of the sprayhead portion 202 from the spray bottle 204, and slightly lifting the sprayhead portion 202 upwardly until the tip of the downtube 208 clears the upper surfaces of the reservoirs 210. The user then forces the tip of the downtube 208 through the metal foil 214 of one of the reservoirs 210 causing it to be punctured. The bottle portion 204 is filled with water either before or after the step of accessing one of the chemical reservoirs 210.

A fourth embodiment of a spray bottle dispenser 300 according the present invention is shown in FIGS. 12 to 14. The spray bottle dispenser 300 comprises a sprayhead portion 302 and a bottle portion 304. The sprayhead portion 302 includes a threaded coupler 306 for connecting the sprayhead portion 302 to a threaded neck of the bottle portion 304. A downtube 308 is connected to the sprayhead portion 302, and extends down to the bottom portion of the bottle portion 304.

In this fourth embodiment, strips 310 and 312 connect together a plurality of chemical reservoirs 314. Five (5) reservoirs are shown in FIG. 12, however, either more or less reservoirs can be utilized.

The reservoir 314 is provided with lines of weakness 316 as shown in FIGS. 13 and 14. The lines of weakness allow the reservoir 314 to burst upon application of force to the reservoir 14. For example, the sides of the bottle portion 304 can be squeezed at the location of one of the chemical reservoirs 314 causing it to burst.

The strips 310 and 312 are preferably secured to the walls of the bottle portion 304. For example, the strips 310 and 312 can be adhered with adhesive, or connected by sonic welding or thermal welding. The strip 310 and chemical reservoirs can be molded from plastic.

In this particular embodiment, the spray bottle dispenser 300 is recharged by bursting one or more of the reservoirs 314. The more reservoirs 314 that are burst, the stronger in concentration the resulting diluted chemical reagent will be. A solvent such as water can be added before of after the bursting operation. The spray bottle dispensers are preferably filled with diluted chemical reagent by the bottler containing the plurality of reservoirs 314 to allow numerous recharging operations.

A fifth embodiment of a spray bottle dispenser 400 according to the present invention is shown in FIGS. 15 to 17. The spray bottle dispenser 400 comprises a sprayhead portion 402 and a bottle portion 404. The sprayhead portion 402 includes a threaded coupler 406 for connecting the sprayhead portion 402 to a threaded neck of the bottle portion 404. A downtube 408 is connected to the sprayhead portion 402, and extends down to the bottom portion of the bottle portion 404.

In this fifth embodiment, a plurality of donut-shaped chemical reservoirs 410 are provided on the downtube 408. Specifically, the donut-shaped chemical reservoirs 410 each have a center hole 412 through which the downtube 408 passes. The chemical reservoirs 410 are provided with a metal foil 414 for sealing an upper end of the chemical reservoir 410 for containing the chemical reagent liquid L, as shown in FIGS. 16 and 17.

In use, the spray bottle dispenser 400 is initially filled by the bottler with dilute chemical reagent and sold at the point-of-sale. After the initial consumption of the diluted chemical reagent, a user unscrews the sprayhead portion 402 from the body portion 404 and lifts the downtube 408 from the bottle portion 404. The user then grips the lowermost reservoir 410 and simple pulls it off the end of the downtube 408, and then punctures the metal foil 414 with and instrument, in particular the tip of the downtube 408. The punctured reservoir 410 is dropped into the bottle portion 410. A solvent such as water is added to the bottle portion 404 before or after the step of puncturing the reservoir 410. The spray bottle dispenser 400 is then reassembled by screwing the sprayhead portion 402 onto the bottle portion 404.

Another embodiment of a donut-shaped chemical reservoir 410' is shown in FIG. 17B. This chemical reservoir 410', is sealed at the top to define an annuler chamber 416 containing the chemical concentrate liquid L. One or more small holes 418 are provided on the internal wall of the throughhole 412' to allow chemical to escape therethrough. The hole 418 is sealed by the outer surface of the downtube when the downtube is inserted through the center hole 118. Further, a thin layer of adhesive or sealant can be applied between the donut-shaped reservoir and the downtube to further ensure sealing of the hole 418.

A sixth embodiment of a spray bottle dispenser utilizes insert 500 as shown in FIGS. 18 to 21. The insert 500 comprises a cylinder portion 502 having a lip portion 504, a connector portion 506 connecting the cylinder portion 502 to an upper reservoir 508, a connector portion 510 connecting the upper reservoir 508 to a middle reservoir 512, and a connector portion 514 connecting the middle reservoir 512 to the lower reservoir 516. A downtube 518 is shown passing through the hollow cylinder portion 502, however, is not connected to the insert 500.

The reservoirs 508, 512 and 516 are in a stacked and stepped arrangement. The upper reservoir 508 is thinner in width and deeper in depth compared with the lower reservoir 516. The middle reservoir 512 has dimensions between those of the upper reservoir 508 and lower reservoir 516. This stepped and stacked arrangement allows access by an instrument to puncture sealing membranes (not shown) sealing each reservoir 508, 512, 516 while the insert remains in the bottle portion of the spray bottle dispenser.

A seventh embodiment of a spray bottle dispenser having an insert 600 is shown in FIGS. 22 and 23. The insert 600 comprises a cylindrical portion 602 having a lip portion 604, a connector portion 608 connecting the cylindrical portion 602 to upper reservoir 610, a connector portion 612 connecting the upper reservoir 610 to middle reservoir 614, and a connector portion 616 connecting the middle reservoir 614 to lower reservoir 618. The top and bottom of each reservoir 610, 614 and 618 are open, and each sealed by upper metal foil 620 and a lower metal foil 622.

In use, the spray bottle dispensers are filled with diluted chemical reagent initially by the bottler, and the downtube is passed only through the cylinder portion 602. After consumption of the initial diluted chemical reagent, the user withdraws the downtube above the level of the upper reservoir 610, and forces the tip of the downtube through the upper metal foil 620 and lower metal foil 622 of the reservoir 610 releasing the chemical concentrate liquid into the bottle portion. A solvent such as water is added before or after the step of accessing the chemical concentrate liquid. After puncturing the metal foil 620 and 622, the downtube is lifted upwardly and then passed between the cylinder portion 602 and the side of the reservoir 610. Alternatively, the downtube can be threaded through the reservoir 610 and down along the side of the middle reservoir 614 so as not to puncture the chemical reservoir 614. The connector portion 608, 612 and 616 are substantially flexible enough to act as hinges to move the lower reservoirs out of the way so as not to be punctured by the downtube during the insertion operation of the downtube.

In an alternative embodiment, only the upper portion of each reservoir is provided with a membrane that can be punctured with the bottoms being molded portions of the reservoirs, and not readily subject to being punctured.

In an eighth embodiment, a mechanical coupler 700 is connected to an insert 702. The insert 702 is identical to the insert shown in FIG. 2, however, with no lip portion 28. The mechanical coupler includes a lip portion 704 and a connector portion 706 connected together by four (4) standoffs 708 (only two are shown in FIGS. 24 and 25). The connector portion 706 is connected to an upper portion of the insert 702, by interference fit, adhesive, sonic welding, thermal welding, or by other suitable connection means.

This arrangement provides four (4) ports 710 to allow water poured through the center of the mechanical coupler 700 to pass through and out the ports 710 into the bottle portion when recharging the spray bottler dispenser with this arrangement.

This arrangement allows the inert 702 to be extruded continuously, since no lip need be molded in the insert 702. The insert 702 is provided with upper and lower sealing membranes (not shown) and then attached to the mechanical coupler 700 during assembly. Thus, the insert 702 can be cut from a continuous length of material extruded at high speed, filled with chemical concentrate, sealed with the sealing membranes at both ends, and then assembled with the mechanical coupler 700 to finish complete assembly.

Dual Reservoir Dispensers

The following embodiments include spray bottle dispensers having a chemical reservoir and a solvent (e.g., diluent such as water) reservoir connected to a dispensing device. The solvent reservoir is refillable, and the chemical reservoir is optionally refillable. In preferred embodiments, both the chemical reservoir and solvent reservoir are located in the bottle of the spray bottle dispenser.

Figure 26:
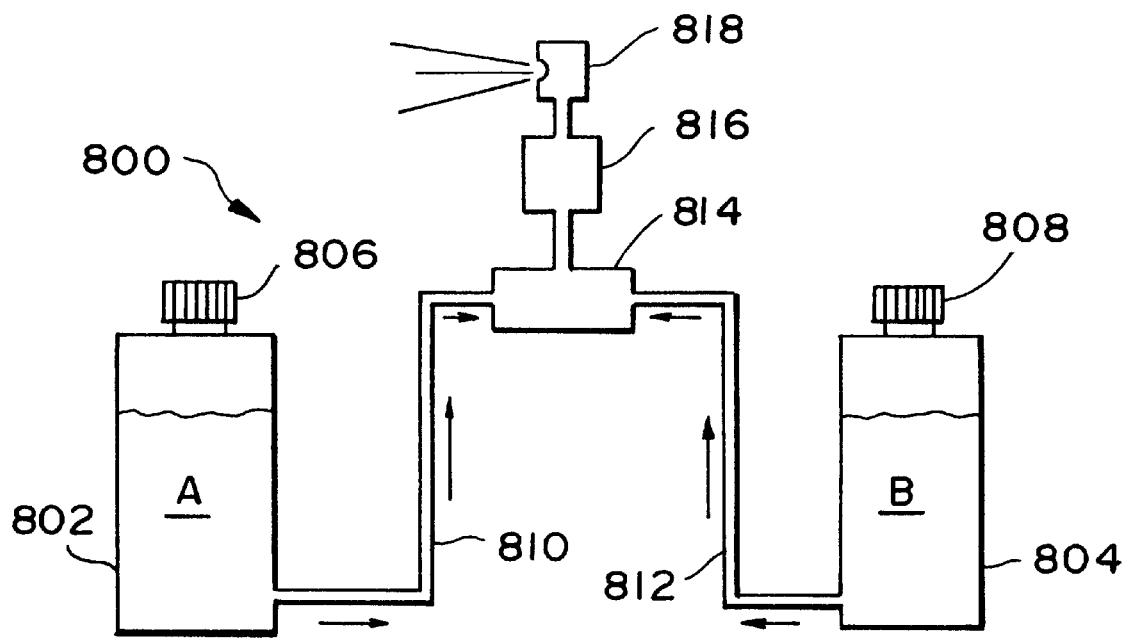
FIG. 26 is a diagrammatic view of an embodiment of a spray dispenser according to the present invention having a separate refillable solvent container and a separate refillable chemical concentrate container.
Figure 27:
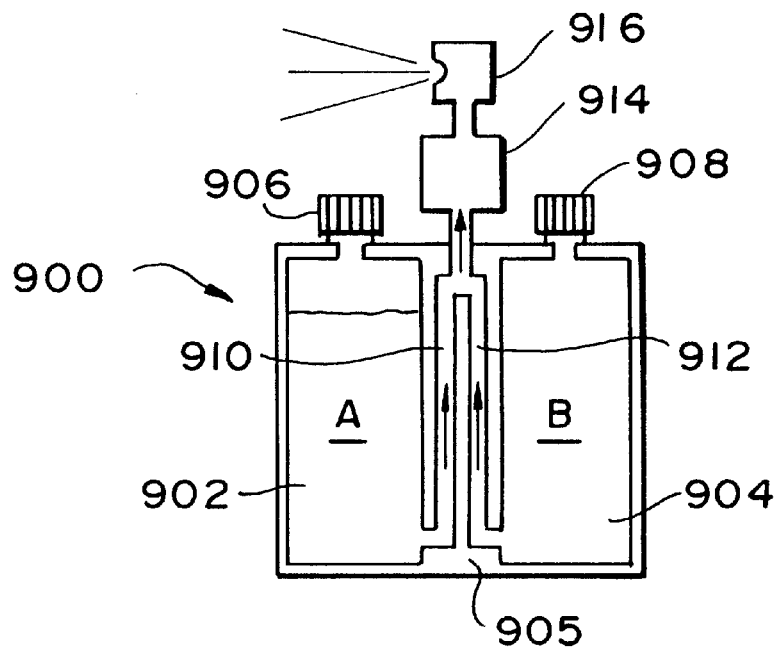
FIG. 27 is a diagrammatic view of an embodiment of a spray dispenser according to the present invention having a combined refillable solvent container and refillable chemical concentrate container.
Figure 31A:
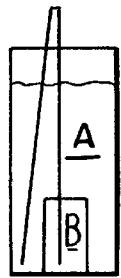
FIG. 31A is a diagrammatic view of a spray dispenser according to the present invention having a smaller chemical concentrate container disposed within and located at the bottom of a larger solvent container.
Figure 31B:
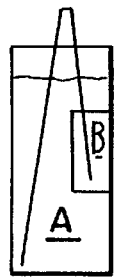
FIG. 31B is a diagrammatic view of a spray dispenser according to the present invention having a smaller chemical concentrate container disposed within and located on the side of a larger solvent container.
Figure 31C:
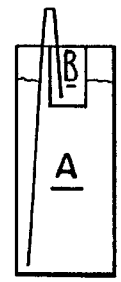
FIG. 31C is a diagrammatic view of a spray dispenser according to the present invention having a smaller chemical concentrate container disposed within and located on the top of a larger solvent container.
Figure 31D:
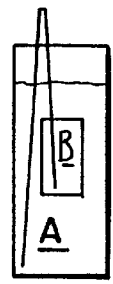
FIG. 31D is a diagrammatic view of a spray dispenser according to the present invention having a smaller chemical concentrate container disposed within and located in the center of a larger solvent container.

A diagrammatic view of a spray dispenser 800 having a separate refillable solvent reservoir 802 and a separate refillable chemical concentrate reservoir 804 is shown in FIG. 26. This arrangement can be utilize with either a pump type sprayhead and/or a pressurized dispensing arrangement (i.e., aerosol).

The refillable solvent reservoir 802 is provided with a resealable closure such as the threaded cap 806 to allow solvent A to be initially added or refilled with additional solvent A. The refillable chemical reservoir 804 is provided with a resealable closure such as the threaded cap 808 to allow chemical concentrate B to be initially added or refilled with additional chemical concentrate B. The threaded caps 80 and 808 can be replaced with other types of conventional resealable closures.

The conduit 810 extending from the solvent reservoir 802 and the conduit 812 extending from the solvent reservoir 804 connect to a mixing chamber 814. Inside the mixing chamber 814, chemical concentrate B is diluted with solvent A forming a working chemical solution having a predetermined chemical concentration of active ingredient(s). The working solution is then dispensed from the spray dispenser. For example, the working chemical solution is drawn up into the pump chamber 816 and forced out of the sprayhead 818.

In the embodiment shown in FIG. 26, the entrance to the conduits 810 and 812 are located at the bottom of the solvent reservoir 802 and chemical concentrate reservoir 804, respectively, to substantially empty the respective reservoirs. However, other suitable arrangements involving down tubes and other conduit passageway arrangements to be discussed in detail below can be substituted for the arrangement shown.

A diagrammatic view of another spray dispenser 900 having a solvent reservoir 902 directly connected to a chemical concentrate reservoir 904. Specifically, the solvent reservoir 902 is connected to the chemical concentrate reservoir 904 by a plastic connecting web 905. For example, the solvent reservoir 902 and chemical concentrate reservoir can be blow mold from a single plastic piece. Alternatively, the reservoirs can be made separately can be connected together with fastening means provided in the reservoirs and/or by separate fastening means.

The refillable solvent reservoir 902 is provided with a resealable closure such as the threaded cap 906 to allow solvent A to be initially added or refilled with additional solvent A. The refillable chemical reservoir 904 is provided with a resealable closure such as the threaded cap 908 to allow chemical concentrate B to be initially added or refilled with additional chemical concentrate B. The threaded caps 906 and 908 can be replaced with other types of conventional resealable closures.

A diagrammatic view of another spray dispenser 1000 having a solvent reservoir 1002 and a chemical concentrate reservoir 1004. The refillable solvent reservoir 1002 is provided with a resealable closure such as the threaded cap 1006 to allow solvent A to be initially added or refilled with additional solvent A. The refillable chemical reservoir 1004 is provided with a resealable closure such as the threaded cap 1008 to allow chemical concentrate B to be initially added or refilled with additional chemical concentrate B. The threaded caps 1006 and 1008 can be replaced with other types of conventional resealable closures.

A downtube 1010 is provided in the solvent reservoir 1002 and a downtube 1012 is provided from the chemical concentrate reservoir 1004. The downtubes 1002 and 1004 connect to a mixing chamber 1014. Inside the mixing chamber 1014, chemical concentrate B is diluted with solvent A forming a working chemical solution having a predetermined chemical concentration of active ingredient (s). The working solution is then dispensed from the spray dispenser. For example, the working chemical solution is drawn into the spray pump 1016, and then dispensed from the sprayhead 1018.

There exists applications where it is desirable that both the solvent reservoir and chemical concentrate reservoir are not provided with resealable closures, as shown in FIG. 29A. For example, the dispenser is marketed for one time use still providing a reduction of shipping weight per unit weight of the dispenser due to the use of chemical concentrate. Alternatively, only the chemical concentrate reservoir is not provided with a resealable closure, as shown in FIG. 29B. For example, due to the toxic and caustic nature of chemical concentrate, it may be desirable to completely seal the chemical concentrate reservoir to prevent child poisoning or damaging chemical spills while still allowing the solvent reservoir of the dispenser to be refilled one or more times.

However, preferably both the solvent reservoir and the chemical concentrate reservoir are both provided with resealable closures, as shown in FIG. 29C, to allow solvent and chemical concentrate respectively to be initially added and subsequently refilled. This arrangement allows the dispenser to be refilled numerous times with both solvent and chemical concentrate solutions prior to being ultimately disposed, and would have significant applications in the area of commercial cleaners consuming large quantities of cleaning chemicals.

In embodiments utilizing downtubes (e.g., FIG. 28), the solvent reservoir and chemical concentrate reservoir can be separate containers, as shown in FIG. 30A. Alternatively, the solvent reservoir and chemical concentrate reservoir can be connected containers, as shown in FIG. 30B. Further, the relative size of the solvent reservoir and chemical concentrate reservoir can be different. For example, a separate smaller chemical concentrate reservoir can be utilize in conjunction with a larger solvent reservoir, as shown in FIG. 30C, or can be connected to a larger solvent reservoir, as shown in FIG. 30D. The use of a smaller chemical concentrate reservoir can be particular desirable to reduced dispenser weight and limit the amount of poisonous and caustic chemical concentrate contained in the dispenser. The smaller chemical concentrate reservoir and concentration of chemical concentrate contained therein can be preselected so that it is completely consumed by the one time consumption of the solvent reservoir, or alternatively, is only partially consumed by the one time consumption of solvent allowing the solvent reservoir to again be refilled one or more times.

A preferred embodiment of the dispensing device according to the present invention includes a smaller chemical concentrate reservoir disposed within a larger solvent reservoir. This arrangement is particularly safe since the chemical concentrate is contained both inside the chemical concentrate reservoir and solvent reservoir. Thus, a child tampering with this arrangement cannot directly access the chemical concentrate without initially accessing the solvent reservoir. Further, the chemical concentrate reservoir can be made to be completely sealed and substantially impenetrable (e.g., hermetically sealed plastic container). In addition, any inadvertent leakage or spillage of chemical concentrate from the chemical concentrate reservoir will be contained inside the solvent reservoir.

In the embodiments shown in FIGS. 31A to 31D, the chemical concentrate reservoir can be provided in various manners. For example, the chemical concentrate reservoir can be a separate container disposed within another container defining the solvent reservoir. Alternatively, the chemical concentrate reservoir can be potentially made as an integral reservoir having one or more walls contiguous with one or more walls of the solvent reservoir. In addition, the chemical concentrate reservoir can be made of pliable material (e.g., thin soft plastic film material).

In embodiments of the dispensing device using a suction pump type arrangement (i.e. conventional spray pump type sprayhead), the liquid chemical concentrate can be drawn into a downtube by suction created by the suction pump arrangement of the sprayhead. If the chemical concentrate is contained in a chemical concentrate reservoir having rigid or semi-rigid walls, then the chemical concentrate reservoir must be vented in some manner to allow liquid to be sucked up the downtube, or alternatively, the chemical concentrate reservoir must be pressurized to force liquid chemical concentrate up the downtube. If the chemical concentrate is contained in a chemical concentrate reservoir having one or more flexible or pliable walls or membranes (i.e., collapsible in some manner), then liquid can be sucked into the downtube without venting causing the chemical concentrate reservoir to collapse to allow for the removal of chemical concentrate solution therefrom.

The chemical concentrate is preferably in the form of a liquid to allow conduits such as downtubes to access the supply of chemical concentrate. Alternatively, the chemical concentrate can be store in one or more states such as solids, particulate, aggregate, emulsions, vapor and other suitable forms. In each of these embodiments, the dispensing device must includes some means for placing the chemical concentrate in contact with solvent to create the dilute working chemical reagent solution. The means for placing the concentrate in contact with the solvent can have continuous, selective or intermittent operation depending on the particular arrangement. For example, a solid chemical concentrate may be placed in continuous contact with liquid solvent by providing the chemical concentrate reservoir with one or more access holes or conduits fluidly connecting the solvent reservoir with the chemical concentrate reservoir.

Figure 32:
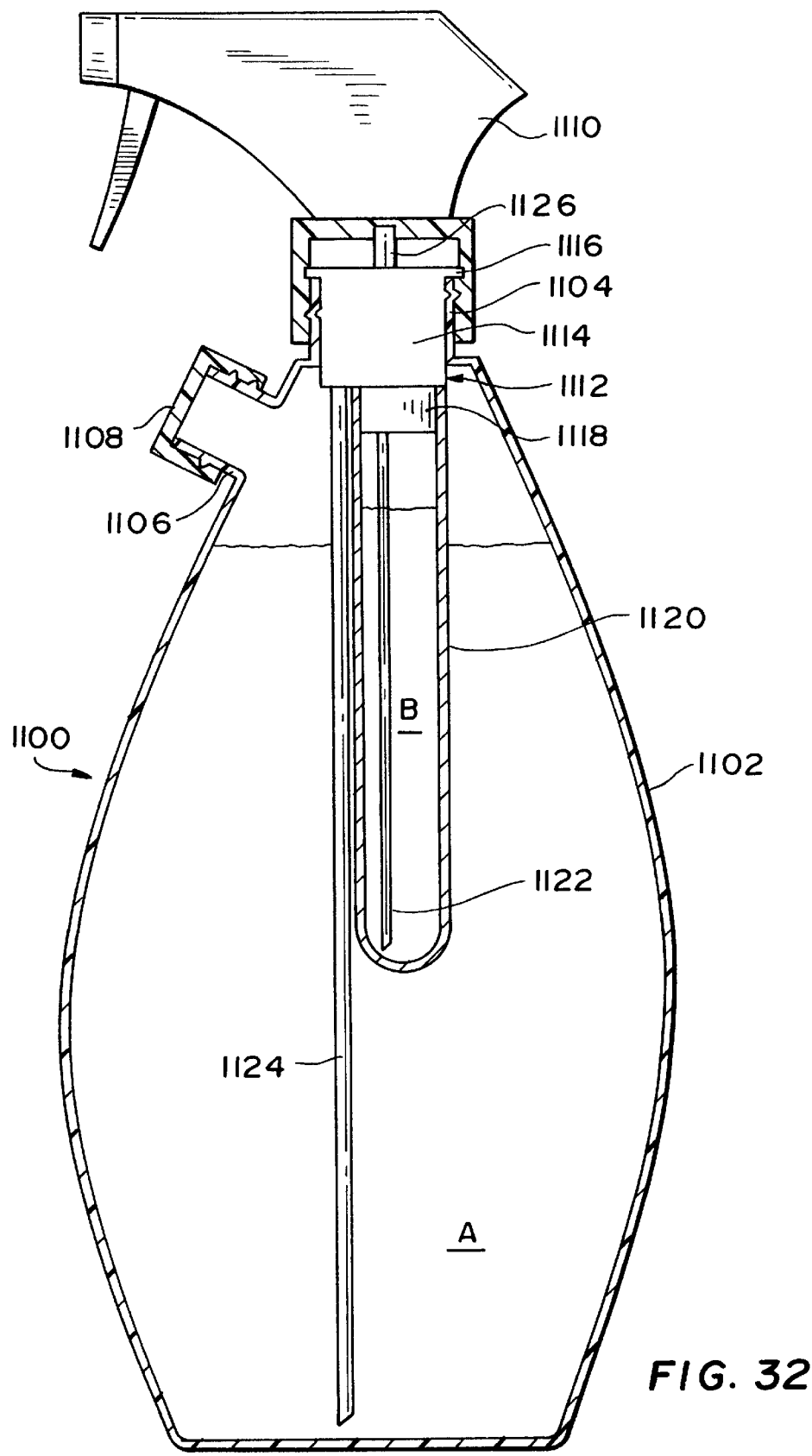
FIG. 32 is a partially broken away and cross-sectional view of an embodiment of a spray device according to the present invention.
Figure 33:
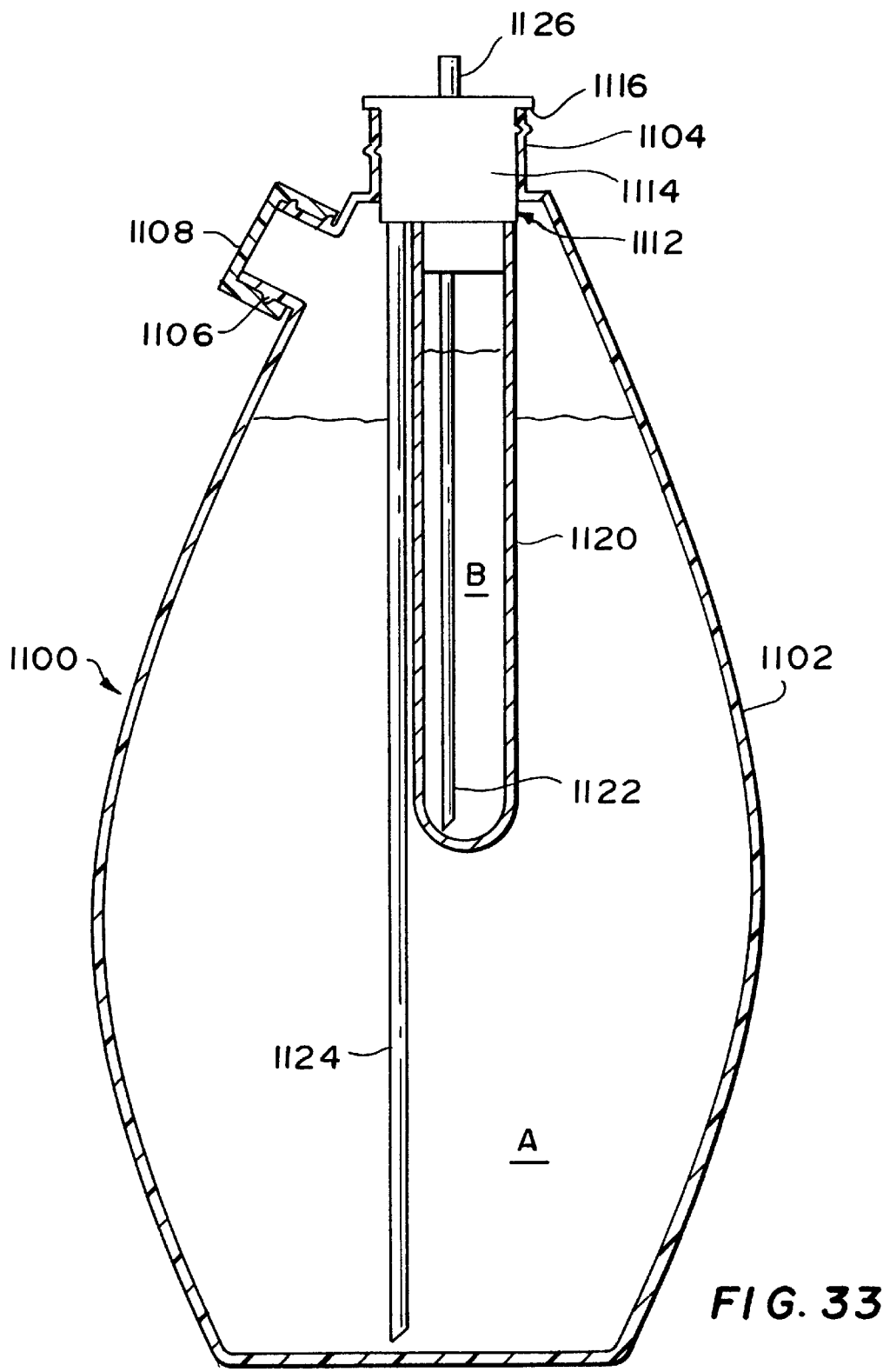
FIG. 33 is a partially broken away and cross-sectional view of an embodiment of a spray device shown in FIG. 32, however, with the sprayhead removed.

A preferred embodiment of a dispensing device according to the present invention is shown in FIG. 32. The dispensing device 1100 comprises a spray bottle 1102 having a neck 1104 and an optional neck 1106. A resealable cap 1108 is connected to the neck 1006 to allow solvent A to be initially added or refill the spray container 1102. A pump type sprayhead 1110 is connected to the neck 1104 for spraying a working mixture of solvent A and chemical concentrate B.

The dispensing device 1100 includes an adapter 1112 comprising a plug-like body 1114 with a radial outwardly extending upper flange 1116 for suspending the adapter 1112 within the neck 1104. The plug-like body 1114 can be dimensioned to be slightly less than the inner dimensions of the neck 1104 to facilitate removal of the adapter 1112, particularly in an embodiment of the spray bottle 1102 not having the optional neck 1106 and resealable cap 1108, to allow refilling of the spray bottle 1102 with solvent. Alternatively, the plug-like body 1114 can be dimensioned to slightly greater than the inner dimensions of the neck 1104 to prevent removal of the adapter 1112, for example, to prevent access to the chemical concentrate B by children. In addition, the plug-like body 1114 can be adhered with adhesive or further connected in some manner, for example by fuzing or welding, to make it nearly impossible to remove the plug-like body 1114 without destroying the plug-like body 1114 and/or spray bottle 1102. In embodiments having the plug-like body 1114 directly connected to the spray bottle 1102, the flange 1116 can be optionally eliminate, since it would cease to function for suspending the plug-like body 1114.

The plug-like body 1114 is provided with a plug-like extension 1118 extending below thereof. The plug-like extension 1118 connects to a container 1102 for containing the chemical concentrate B. For example, the container 1102 can be connected by interference fit between the outer dimensions of the plug-like body and inner dimensions of the upper portion of the container 1102. Alternatively, the container 1102 can be connected in some other suitable manner to the plug-like extension 1114, for example screw connection, adhesive, fusing, welding, mechanical fastener, etc.) providing either a removable or non-removable connection therebetween.

A particularly suitable container 1102 is a test tube shaped container having a cylindrical body with a hemispherical end portion as shown in FIG. 32. The test tube shaped container 1102 can be made of glass providing outstanding chemical resistivity, however, plastic may be more suitable to prevent inadvertent breakage thereof. Alternatively, other suitable shape and size containers can be substituted for the test tube shaped container 1102. The larger the container 1102, the more chemical concentrate can be stored inside the spray container 1102, however, using up additional space for solvent A in the same size spray container 1102.

A downtube 1122 is provided inside the container 1120 for allowing chemical concentrate B to be drawn up through the downtube 1122 into the plug-like adapter 1112 where mixing occurs with the solvent A. In addition, a downtube 1124 is provided inside the spray bottle 1102 allowing solvent A to be drawn up through the downtube 1124 into the plug-like adapter 1112 where mixing occurs with the chemical concentrate B.

The plug-like adapter 1112 is provided with a tubular extension 1126 for connection with the sprayhead 1110. For example, the plug-like adapter 1112 is a plastic injection mold piece having a tubular extension 1126 mold upwardly therefrom. The tubular extension 1126 can be shaped and dimensioned to be the size of a conventional downtube so that it can be received within the conventional downtube receiver of a conventional sprayhead. Alternatively, plastic tubing other suitable conduit arrangement can be substituted to provide a liquid connection between the adapter 1114 and sprayhead 1110.

Figure 34:
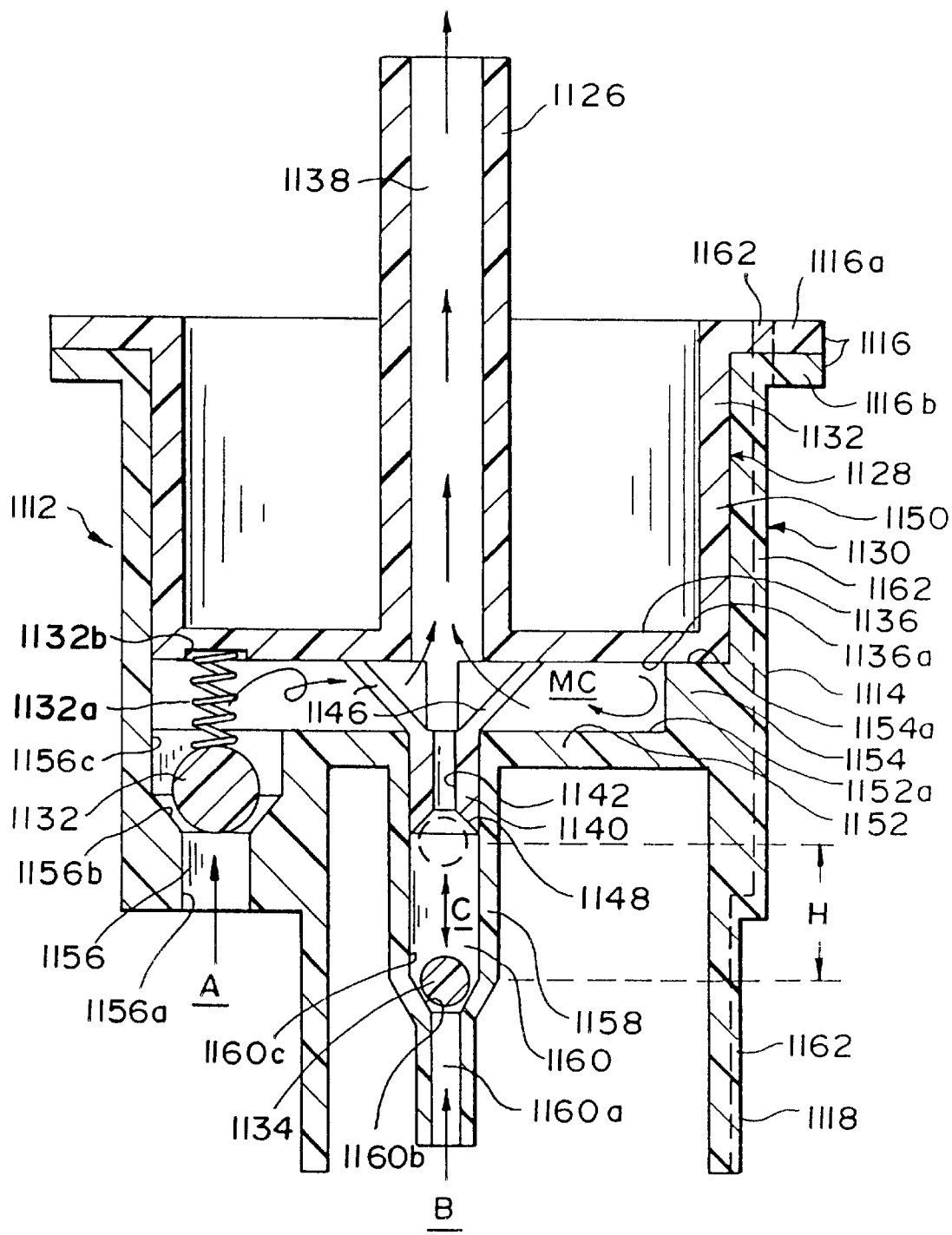
FIG. 34 is a detailed cross-sectional view of a fully assembled adapter used in the spray device shown in FIGS. 32 and 33.
Figure 35:
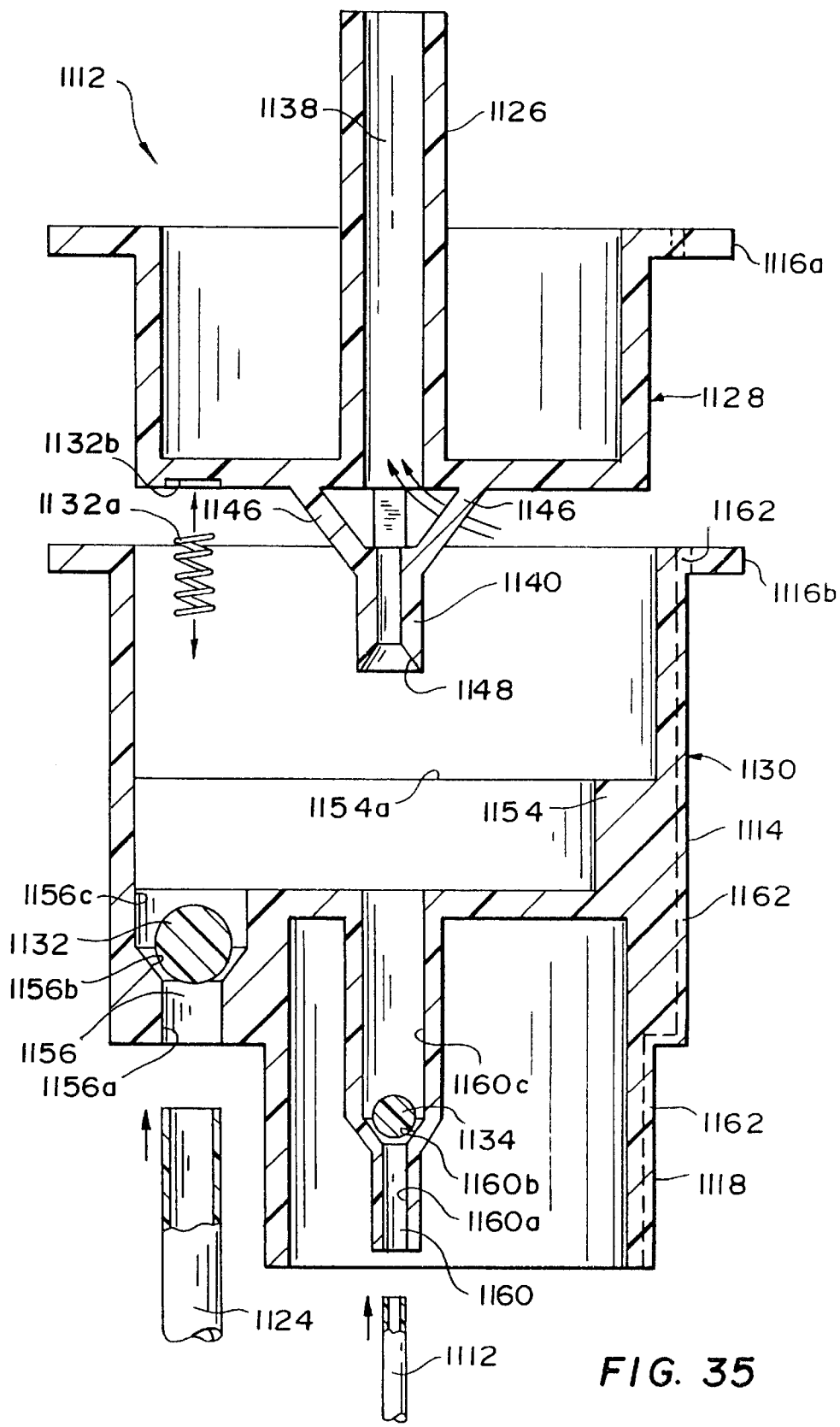
FIG. 35 is a detailed cross-sectional view of a disassembled adapter shown in FIG. 34.

The detail configuration of a preferred adapter 1112 will be described below and is shown in FIGS. 34 and 35. The adapter 1112 is made of four (4) separate components including an upper body portion 1128, a lower body portion 1130, a ball float 1132, and a ball float 1134 assembled together as shown in FIG. 34.

The upper body portion 1128 and lower body portion 1130 are preferable made by plastic injection molding to have the configuration shown. The upper body portion 1130 comprises a cylindrical body portion 1132 connecting to an upper flange portion 1116a and a lower disk portion 1136. The tubular extension 1126 extends upwardly from the lower disk portion 1136 defining a fluid passageway 1138 through the upper body portion 1130.

A tubular extension 1140 having a fluid passageway 1142 is supported below the lower disk portion 1136 by a plurality of spaced apart supports 1146. For example, the spaced apart supports 1146 are set apart at ninety (90) degree increments providing four fluid passageways or ports therebetween (e.g., cage-like structure). The lower portion of the tubular extension 1140 is provided with a funnel-shaped passageway portion 1148.

The lower body portion 1130 comprises a cylindrical body portion 1150 connecting to an upper flange portion 1116b and a lower disk portion 1152. The cylindrical body 1150 is also is provided with a lower flange portion 1154 having an upper surface portion 1154a on which the bottom of the upper body portion 1128 rests. Specifically, the upper surface portion 1154a of the lower flange portion 1154 serves as a stop to limit the extent the upper body portion 1128 fits inside the lower body portion 1130. In addition, the plug-like extension is provided at the bottom of the lower body portion 1130 for connecting with the container 1120 as described above.

A mixing chamber MC is defined between the lower surface 1136a of the lower disk portion 1136 of the upper body portion 1128 and the upper surface 1152a of the lower disk portion 1152 of the lower body portion 1130. The height of the lower flange portion 1144 of the lower body portion 1130 defines the height of the mixing chamber MC. The mixing chamber MC is in continuous fluid connection with the passageways 1138 and 1142 of the upper body portion 1128.

The lower body portion 1130 is provided with a fluid passageway 1156 comprising a lower passageway portion 1156a, a funnel-shaped passageway portion 1156b, and an upper passageway portion 1156c. The lower passageway portion 1156a is dimensioned to provide an interference fit connection with an upper portion of the downtube 1124 (See FIG. 35). Further, the upper passageway portion 1156c is dimensioned to accommodate the ball float 1132 and the funnel-shaped passageway portion 1156b is oriented to cup the ball float 1132 and provide a one-way valve so that liquid solvent A can only move up the downtube 1124 into the mixing chamber MC preventing mixed fluid in the mixing chamber MC to move through the one-way valve and down through the downtube 1124 into the spray bottle 1102. A spring 1132a is optionally provided to slightly bias the ball float 1132 to seat against surfaces of the funnel-shaped passageway portion 1156b to further ensure that there is no leakage of mixed fluid from the mixing chamber MC into the downtube 1124. The one end of the spring 1132a is biased against the curved surface of the ball float 1132 and the opposite end of the spring 1132a is received within a circular recess 1132b provided in the bottom of the cylindrical body 1150. This arrangement anchors the ends of the spring 1132a to maintain its orientation during operation. Other types of springs or biasing means can be substituted for the spring 1132b (e.g., cantilever spring).

The lower body portion 1128 is also provided with a tubular extension 1158 having a fluid passageway 1160. The fluid passageway 1160 comprises a lower fluid passageway portion 1160a, a funnel-shaped fluid passageway portion 1160b, and an upper fluid passageway portion 1160c. The lower passageway portion 1160a is dimensioned to provide an interference fit connection with an upper portion of the downtube 1112 (see FIG. 35). Further, the upper passageway portion 1160c is dimensioned to accommodate the ball float 1134 and the funnel-shaped passageway portion 1160b is oriented to cup the ball float 1134 and provide a one-way valve so that liquid chemical concentrate B can only move up the downtube 1112 into the mixing chamber MC preventing mixed fluid in the mixing chamber MC to move down through the one-way valve and down through the downtube 1112 into the container 1120. Further, the funnel-shaped passageway portion 1148 of the tubular extension 1140 cups the ball float 1134 when it moves upwardly stopping its upward movement and creating a one-way valve having an opposite flow operation with respective to the lower one-way valve.

The two (2) one-way valves of the tubular extension 1158 define a metering valve. Specifically, the travel height H of the ball float 1134 defines a metering chamber C having a fixed volume for metering the amount of liquid chemical concentrate to be delivered to the mixing chamber MC. Further, the ball float 1134 is dimensioned less than the inner diameter of the liquid passageway 1160 to allow liquid to move around the ball float 1134 during a portion of the metering operation to be discussed below.

As shown in FIG. 35, the upper body portion 1128 is separate from the lower body portion 1130. The upper body portion 1128 is connected to the lower body portion 1130 in the assembled adapter 1112. For example, the flange portions 1116a and 1116b can be adhered or welded together to complete the assembly. In any event, the junction between the upper body portion 1128 and lower body portion 1130 must be sealed in order to seal the mixing chamber MC.

The plug-like adapter 1112 must be provided with an air passageway connecting the air space located above the adapter 1112 and below the sprayhead 1110 to air spaces in the spray bottle 1102 and container 1120 so that when volumes of liquid solvent A and liquid chemical concentrate B are removed from the spray bottle 1102 and container 1120, respectively, volumes of air are added therein to account for the loss of volumes of liquid. However, if the container 1120 is a pliable or flexible walled container, for example a collapsible container (e.g., balloon-like container) then an air passageway is not required to the container 1120.

An air passageway 1162 can be provided along the side of the plug-like adapter 1112. For example, a hole can be provided in the flange 1116 extending to a groove provided along the side of the lower body portion 1130. This arrangement provides an air passageway into the spray bottle 1102. The groove can be extended along the plug-like extension 1118 for also providing an air passageway into the container 1120 containing liquid chemical concentrate B.

In an alternative embodiment, it is possible to eliminate or rearrange the location of one-way valves to prevent contamination of the liquid solvent A and liquid chemical concentrate B. For example, a single one-way valve can be provide in the liquid passageway 1138, however, this arrangement still places the working liquid in the mixing chamber MC with the liquid solvent A and liquid chemical concentrate B. Further, other suitable metering arrangements can be devised and substituted for the one shown and described.

Optionally, the plug-like adapter 1112 is provided with a valve to control (e.g., open and close) the liquid passageway reaching or passing through liquid passageway 1138. This would further prevent misuse, and/or prevent leakage of mixed liquid chemical from the mixing chamber MC.

In operation, after the downtubes 1112 and 1124 and mixing chamber MC have been primed, operation of the sprayhead 1110 (FIG. 32) draws liquid under suction upwardly from the mixing chamber MC, through the spaced apart ports defined by the supports 1146 and then up through the fluid passageway 1138 to supply the sprayhead 1110 with a mixture of working liquid having the proper concentration of active ingredients.

As liquid is sucked from the mixing chamber MC, the ball float 1132 defining a one-way valve moves upwardly allowing liquid solvent A to be drawn up through the downtube 1124, through the passageway 1156 into the mixing chamber MC. Simultaneously, the ball float 1134 of the metering valve moves upwardly allowing the volume of liquid chemical concentrate positioned above the ball float 1134 to move upwardly into the mixing chamber MC. The ball float 1134 will move upwardly drawing liquid chemical concentrate up the downtube 1112 into the metering chamber C now located below the ball float 1134 until the ball float 1134 is stopped by the funnel-shaped fluid passageway 1148. When the sprayhead relieves the liquid suction inside the mixing chamber MC at the end of each spray cycle (i.e., when trigger handle of pump is pulled fully in), the ball float 1134 moves downwardly due to gravity while allowing liquid chemical concentrate to flow around its outside and again fill the metering chamber for the next spray cycle.

The liquid solvent A and the liquid chemical concentrate B entering the mixing chamber are free to thoroughly mix prior to moving upwardly through the liquid passageway 1138 to the sprayhead 1110. Further, there exists some agitation enhancing liquid mixing inside the mixing chamber due to the different locations of entrance of the liquid solvent and liquid chemical concentrate in additions to the cage-like structure of the spaced apart supports 1146 located inside the mixing chamber MC and defining spaced apart liquid ports entering into the liquid passageway 1138.

When the dispensing device 1100 is not in use, working chemical in the mixing chamber cannot move downwardly through the downtubes 1124 and 1112 due to the one-way valves defined by the ball floats 1132 and 1134, respectively. This prevents the contamination of the spray bottle containing solvent A and the container 1120 containing chemical concentration B from being contaminated with working liquid from the mixing chamber MC.

The liquid chemical concentrate located in the metering chamber C above the ball float 1134 mixes with time to some extent with the working liquid in the mixing chamber. However, in operation after one or two spray cycles, the metering valve is fully operative delivering a fixed volume of liquid concentrate to the mixing chamber as discussed above.

Figure 38:
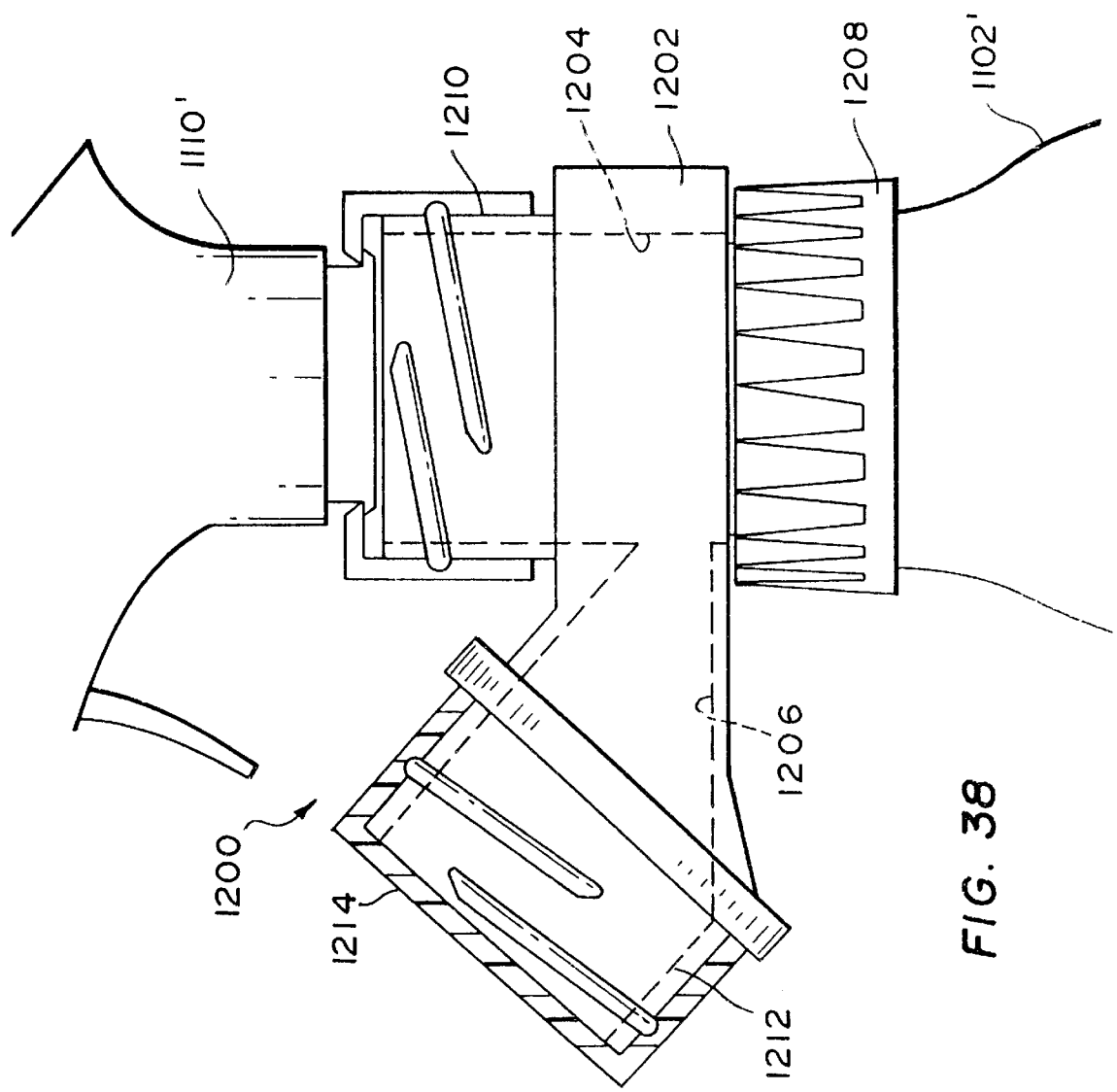
FIG. 38 is a side elevational view of another type of adapter for converting a conventional one neck spray bottle to a two neck spray bottle.

Another type of adapter 1200 for converting a conventional one neck spray bottle to a two neck spray bottle is shown in FIG. 38. Specifically, the adapter 1200 comprises an adapter body having a liquid passageway 1204 connecting into a liquid passageway 1206. The adapter body 1202 is provided with a inner threaded cap 1208. The threaded cap 1208 can be molded as an integral unit with the adapter body 1202, or can be a separate piece rotatably connected to the adapter body. The connection between the adapter body 1202 and the threaded cap 1208 can be the same or similar to the type of connection between the inner threaded cap of a conventional sprayhead and the body of the conventional sprayhead allowing relative rotation and sealing therebetween. This type arrangement allows the orientation of the adapter relative to the spray bottle to which it is connected to be varied.

The inner threaded cap 1208 is connected to the outer threaded neck of a conventional one neck spray bottle. The adapter body 1202 is provided with a first outer threaded neck 1210 for connection with the inner threaded cap of a conventional sprayhead. The adapter body 1202 is also provided with a second outer threaded neck 1212, which can be provided with a reusable inner threaded cap 1214. Alternatively, the adapter body 1202 can be provided with another type of second resealable closure (e.g., threaded plug and inner threaded neck, twist open valve, stop cock type valve, etc.).

What is claimed is:

1. A multiple fluid spray pump dispensing apparatus, comprising:

a spray bottle having a threaded neck portion;

a manually actuated pump-type spray head connected to said spray bottle;

a first fluid reservoir for storing a first fluid, said first fluid reservoir disposed inside said spray bottle;

a second fluid reservoir for storing a second fluid, said second fluid reservoir disposed inside said spray bottle;

a plug-like fluid mixing device including a fluid mixing chamber for mixing together first fluid and second fluid for generating mixed fluid, said fluid mixing chamber being disposed within said neck portion of said spray bottle, said fluid mixing device connected to said spray head for transferring mixed fluid from said fluid mixing device to said spray head;

a first downtube configured for withdrawing first fluid from said first reservoir, said first downtube connected to said fluid mixing device for transferring first fluid from said first reservoir to said fluid mixing device; and a second downtube configured for withdrawing second fluid from said second reservoir, said second downtube connected to said fluid mixing device for transferring second fluid from said second reservoir to said fluid mixing device.

2. An apparatus according to claim 1, wherein said fluid mixing device is a fluid metering and mixing device for metering at least one of the first fluid and second fluid and for mixing together first and second fluids to generate the mixed fluid for dispensing.

3. An apparatus according to claim 2, wherein said fluid metering and mixing device is configured for mixing together first fluid and second fluid at a predetermined ratio.

4. An apparatus according to claim 2, wherein said fluid metering and mixing device includes at least one metering chamber connected to the fluid mixing chamber.

5. An apparatus according to claim 1, wherein said first fluid reservoir is defined by at least a portion of an interior volume of said spray bottle and said second reservoir is connected to said fluid mixing device.

6. An apparatus according to claim 5, wherein said second reservoir is suspended inside said spray bottle from said fluid mixing device.

7. An apparatus according to claim 6, wherein said second reservoir is a test tube-like container connected at an upper end to said fluid mixing device, and said first down tube positioned adjacent and parallel relative to said test tube-like container.

8. An apparatus according to claim 1, wherein said fluid mixing device is configured so that a portion of said fluid mixing device fits through an open end of said neck portion of said spray bottle.

9. An apparatus according to claim 1, wherein said fluid mixing device is configured so that fluid mixing device can be installed inside said spray bottle, and then subsequently removed for replacement with another fluid mixing device.

10. An apparatus according to claim 1, including first fluid contents and second fluid contents.

11. An apparatus according to claim 10, wherein said first fluid contents is a diluent and said second fluid contents is a chemical concentrate.

12. An apparatus according to claim 1, wherein said spray bottle includes a resealable opening for addition of the first fluid to said first reservoir without disturbing a connection between said spray bottle and spray head.

13. An apparatus according to claim 12, wherein said resealable opening is defined by another threaded neck of said spray bottle provided with a threaded cap for opening and sealing an opening through said another threaded neck into said first reservoir.

14. A spray bottle adapter for use with a non-pressurized spray bottle provided with a pump-type spray head for making a multiple fluid dispensing apparatus, comprising:

an insert including a portion installed in a neck portion of the non-pressurized spray bottle, said insert comprising a body having a mixing chamber and an uninflatable reservoir for a first fluid, said insert configured for withdrawing said first fluid from said uninflatable reservoir and a second fluid from the non-pressurized spray bottle into said mixing chamber for producing a mixed fluid, and including means for fluidly connecting said insert to said pump-type spray head for supplying mixed fluid to said pump-type spray head.

15. An adapter according to claim 14, wherein said insert includes a plug-like body provided with a radial outwardly extending upper flange for suspending the adapter within the neck of the non-pressurized spray bottle.

16. An adapter according to claim 14, wherein said plug-like body is dimensioned to be slightly less than inner dimensions of said neck to facilitate removal of the adapter.

17. An adapter according to claim 14, wherein said plug-like body is dimensioned to be slightly greater than inner dimensions of said neck to prevent removal of the adapter.

18. An adapter according to claim 14, wherein said plug-like body is adhered or welded to said non-pressurized spray bottle to prevent removal of the adapter.

19. An adapter according to claim 14, wherein said insert is one-piece when assembled.

20. A multiple fluid spray dispensing apparatus, comprising:

a spray bottle having an outer wall enclosing and defining a first fluid reservoir for a first fluid and a neck;

a manually operated trigger-type spray head connected to said spray bottle; and an adapter including a body portion with a radial outwardly extending upper flange portion, said adapter including a second fluid reservoir suspended inside said first fluid reservoir of said spray bottle by said body portion of said adapter, said adapter including a first downtube configured for withdrawing fluid from said first fluid reservoir and a second downtube configured for withdrawing fluid from said second fluid reservoir, said adapter including a mixing chamber disposed in said neck and at least one metering valve for metering at least one of the first fluid and the second fluid into said metering chamber.

21. An apparatus according to claim 20, wherein said body portion of said adapter includes a plug-like extension and said second fluid reservoir is a test tube-like container connected to said plug-like extension.

22. An apparatus according to claim 20, wherein said metering valve includes a metering chamber containing a metering ball, said metering chamber includes a one-way valve at one end and an oppositely oriented one-way valve at an opposite end of said metering chamber allowing a predetermined volume fluid to be injected into said mixing chamber of said adapter during a spray head pump cycle.

23. A spray bottle adapter for converting a one fluid spray dispensing apparatus comprising a spray bottle having an externally threaded neck and a manually operated trigger-type spray head having an internally threaded coupler into a multiple fluid spray dispensing apparatus, said adapter comprising:
- a plug-like body configured for being installed in a neck portion of the spray bottle, said plug-like body including a radial outwardly extending upper flange for suspending the adapter within the neck of the spray bottle, said plug-like body including a mixing chamber and at least one metering valve;
- a tubular extension extending below said plug-like body;
- an uninflatable container for storing a first fluid, said uninflatable container rigidly connected to said tubular extension;
- a first downtube for withdrawing said first fluid from the spray bottle into said mixing chamber;
- a second downtube for withdrawing fluid from said uninflatable container into said mixing chamber; and
- a tubular connector for connecting the adapter to the manually operated trigger-type spray head.

24. An adapter according to claim 23, wherein said plug-like body includes an upper body portion connected to a lower body portion.

25. An adapter according to claim 24, wherein said upper body portion nests inside said lower body portion.

26. An adapter according to claim 25, wherein said upper body portion comprises a cylindrical body portion connecting to an upper flange portion and a lower disk portion, and said lower body portion comprises a cylindrical body portion connecting to an upper flange portion and a lower disk portion.

27. An adapter according to claim 26, wherein said lower body portion further includes an inner lower flange portion serving as a stop to limit extent of said upper body portion nesting inside said lower body portion.

28. An adapter according to claim 23, wherein said lower body portion includes a first fluid passageway provided with a fluid check valve and a second fluid passageway provided with said metering valve.

29. An adapter according to claim 28, wherein said metering valve includes a metering chamber containing a metering ball, said metering chamber including a one-way valve at one end and an oppositely oriented one-way valve at an opposite end of said metering chamber allowing a predetermined volume fluid to be injected into said mixing chamber of said adapter during a spray head pump cycle.

30. An adapter according to claim 28, wherein said check valve provided in said first passageway is a ball check valve, and a spring is provided for biasing said ball check valve closed to ensure complete sealing.

31. An adapter according to claim 29, wherein said check valve provided in said first passageway is a ball check valve, and a spring is provided for biasing said ball check valve closed to ensure complete sealing.

32. An adapter according to claim 23, wherein said uninflatable container is removably connected to said plug-like extension.

33. An adapter according to claim 23, wherein said uninflatable container is connected to said plug-like extension in a non-removable manner.

34. A method of converting a single fluid spray dispensing apparatus comprising a single reservoir non-pressurized spray bottle having an externally threaded neck and a manually operated trigger pump-type spray head provided with an internally threaded coupler into a multiple fluid spray dispensing apparatus, comprising the steps of:
- inserting and installing an adapter into a neck portion of the spray bottle, said adapter being defined by an insert comprising a body having a mixing chamber and an uninflatable reservoir for a first fluid, said insert configured for withdrawing said first fluid from said uninflatable reservoir and a second fluid from the non-pressurized spray bottle into said mixing chamber for producing a mixed fluid, and including means for fluidly connecting said insert to said manually operated trigger pump-type spray head for supplying mixed fluid to said manually operated trigger pump-type spray head, through a neck of the non-pressurized spray bottle; and
- connecting the manually operated trigger pump-type spray head to the adapter and the non-pressurized spray bottle.

35. The method according to claim 34, wherein the non-pressurized spray bottle and manually operated trigger pump-type spray head are not modified in any manner to accommodate application of the adapter.

* * * * *